United States Patent [19]
Koden et al.

[11] Patent Number: 5,507,975
[45] Date of Patent: * Apr. 16, 1996

[54] FERROELECTRIC LIQUID CRYSTAL DISPLAY

[75] Inventors: Mitsuhiro Koden; Tomoaki Kuratate, both of Nara; Fumiaki Funada, Yamatokoriyama; Kazuhiko Sakaguchi, Toyonaka; Yutaka Shiomi, Amagasaki; Tohru Kitamura, Kyoto, all of Japan

[73] Assignee: Sharp Kabushiki Kaisha, Osaka, Japan

[ * ] Notice: The portion of the term of this patent subsequent to May 3, 2011, has been disclaimed.

[21] Appl. No.: 266,155

[22] Filed: Jun. 27, 1994

Related U.S. Application Data

[63] Continuation of Ser. No. 892,299, Jun. 2, 1992, abandoned, which is a continuation-in-part of Ser. No. 655,545, Feb. 14, 1991, abandoned.

[30] Foreign Application Priority Data

Feb. 15, 1990 [JP] Japan ................. 2-037053

[51] Int. Cl.$^6$ ................. C09K 19/34; G02F 1/13
[52] U.S. Cl. ................. 252/299.61; 359/103
[58] Field of Search ................. 252/299.61

[56] References Cited

U.S. PATENT DOCUMENTS

| | | | |
|---|---|---|---|
| 4,909,957 | 3/1990 | Sakaguchi et al. | 252/299.61 |
| 4,973,425 | 11/1990 | Kazuhiko et al. | 252/299.61 |
| 5,026,506 | 6/1991 | Koden et al. | 252/299.61 |
| 5,061,398 | 10/1991 | Takehara et al. | 252/299.01 |
| 5,106,529 | 4/1992 | Ichimura et al. | 252/299.01 |
| 5,151,214 | 9/1992 | Koden et al. | 252/299.61 |
| 5,215,678 | 6/1993 | Koden et al. | 252/299.61 |
| 5,256,330 | 10/1993 | Koyama et al. | 252/299.61 |
| 5,308,539 | 5/1994 | Koden et al. | 252/299.61 |
| 5,338,482 | 8/1994 | Sakaguchi et al. | 252/299.61 |

FOREIGN PATENT DOCUMENTS

| | | |
|---|---|---|
| 384432 | 8/1990 | European Pat. Off. . |
| 0388141A1 | 9/1990 | European Pat. Off. . |
| 0410447A2 | 1/1991 | European Pat. Off. . |

*Primary Examiner*—Gary L. Geist
*Assistant Examiner*—C. Harris
*Attorney, Agent, or Firm*—David G. Conlin; Linda M. Buckley

[57] ABSTRACT

A ferroelectric liquid crystal device having a pair of substrates each provided with voltage applying means, an orientation control layer formed on at least one of the substrates, and a layer of ferroelectric liquid crystal composition disposed between the pair of substrates, the ferroelectric liquid crystal composition comprising at least one compound (a) having an optically active group of the formula (I):

$$-\overset{*}{C}H\diagdown\overset{CH_2}{\underset{O-C}{\diagup}}\overset{*}{\underset{\diagdown}{C}}\diagdown\overset{CH_3}{\underset{\diagup}{}}\quad (I)$$

at least one compound (b) which is reverse to the compound (a) in the direction of a helical pitch induced in a nematic phase and at least one liquid crystal compound (c) exhibiting a smectic C phase, the liquid crystal composition exhibiting at least a smectic C phase, smectic A phase and nematic phase.

7 Claims, 1 Drawing Sheet

FERROELECTRIC LIQUID CRYSTAL DISPLAY

This is a continuation of application Ser. No. 07/892,299 filed on Jun. 2, 1992 now abandoned, which is a continuation-in-part application of U.S. Ser. No. 07/655,545, filed Feb. 14, 1991, which is abandoned.

BACKGROUND OF THE INVENTION

1. Field of the Invention

This invention relates to a ferroelectric liquid crystal device and more particularly to a ferroelectric liquid crystal device which comprises substrates, voltage applying means, an orientation control layer and a ferroelectric liquid crystal composition layer and is usable as a liquid crystal shutter, a liquid crystal display device or the like.

2. Description of the Related Art

Liquid crystal display devices most widely used at present are those utilizing nematic phase, but they have a drawback such that a display of large capacity such as of 2,000×2,000 lines is hard to realize. Specifically, in ordinary twisted nematic (TN) type liquid crystal display devices, contrast decreases as the number of lines increases, so that it is nearly impossible in practice to produce a display device of large capacity such as of 2,000×2,000 lines, with a good appearance.

In order to eliminate the drawback of the TN type liquid crystal display devices, liquid crystal display devices of super twisted nematic (STN) type and double super twisted nematic (DSTN) type have been developed. However, they also have a drawback such that contrast and response speed decrease as the number of lines increases. Therefore, it is presently the utmost level that such display devices be provided with a display capacity of approximately 800× 1024 lines.

On the other hand, there has been also developed a liquid crystal display device of active matrix type where thin film transistors (TFT) are arranged on a substrate, whereby a large capacity display of 1,000×1,000 lines and the like can be realized technically. However, the device has a drawback such that its production process takes a longer time with poor yield, leading to a very high production cost.

As means to solve the problems described above, a ferroelectric liquid crystal display device, which is proposed as a liquid crystal display based on a principle different from that for the TN type display device, has been expected to be promising (N. A. Clark, et al, Appl. Phys, Lett., 36, 899 (1980)). In such a display device, a ferroelectric liquid crystal capable of exhibiting chiral smectic C phase, chiral smetic I phase, etc. is utilized for operation. Because the principle of the device is classified in a type utilizing memory characteristics of the liquid crystal, a larger display capacity may potentially be realized if response speed improves. Because the process does not require an active element such as thin film transistor, the cost for producing the liquid crystal device may not rise.

Furthermore, the ferroelectric liquid crystal device has also a merit of a wide view angle, so that it is considered promising as a device for a display of a larger capacity of 2,000×2,000 lines.

Liquid crystal materials used in a ferroelectric liquid crystal display device utilizing the smectic C phase above-said is required to exhibit smectic C phase within a wide temperature range of which center is around room temperature. The liquid crystal materials is also required to satisfy various conditions such as high speed response as a device property for realizing a larger capacity display at the first. In this regard, liquid crystal materials are to show large spontaneous polarization and lower viscosity. Furthermore, possessing a phase sequence such as IAC (Isotropic-Smectic A-Smectic C) or INAC (Isotropic-Nematic-Smectic A-Smectic C) is required in order to obtain good orientation and bistability when the ferroelectric liquid crystal is applied to a liquid crystal cell, the good orientation and bistability also requiring a spiral pitch of nematic phase and smectic C phase to be sufficiently longer than the thickness of cell. Also, possessing a large tilt angle is needed in order to improve contract and brightness in liquid crystal display.

However, it is impossible at present to satisfy all of such requirements with a single compound. Therefore, a plurality of compounds are mixed together and practically applied as a liquid crystal composition but a sufficiently satisfying liquid crystal composition has not yet been realized. For producing a liquid crystal composition which meets practical requirements, many single liquid crystal compounds having various properties are to be used in combination and it may require as a content of liquid crystal composition a compound without showing any liquid crystal phase.

SUMMARY OF THE INVENTION

The present invention has been accomplished under the foregoing situations and is to provide a ferroelectric liquid crystal device comprising such a ferroelectric liquid crystal composition as having a wider operable temperature range, a good orientation and memory characteristic, a larger tilt angle, and a high-speed response at room temperature.

According to the present invention, there is provided a ferroelectric liquid crystal device having a pair of substrates each provided with voltage applying means, an orientation control layer formed on at least one of the substrates, and a layer of ferroelectric liquid crystal composition disposed between the pair of substrates, the ferroelectric liquid crystal composition comprising at least one compound (a) having an optically active group of the formula (I):

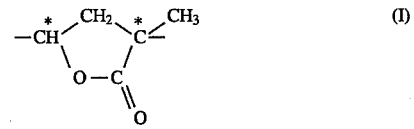

at least one compound (b) which is reverse to the compound (a) in the direction of a helical pitch induced in a nematic phase, and at least one liquid crystal compound (c) exhibiting a smectic C phase, the liquid crystal composition exhibiting at least a smectic C phase, smectic A phase and nematic phase.

The ferroelectric liquid crystal device of the present invention has a good orientation characterisitic of the liquid crystal layer, shows a higher contrast developing a bright display and permits a wider operable temperature range with larger tilt angle, so that it is quite useful as a liquid crystal device of large capacity for display and photoswitching.

DETAILED DESCRIPTION OF THE PREFERRED EMBODIMENT

Figure 1:
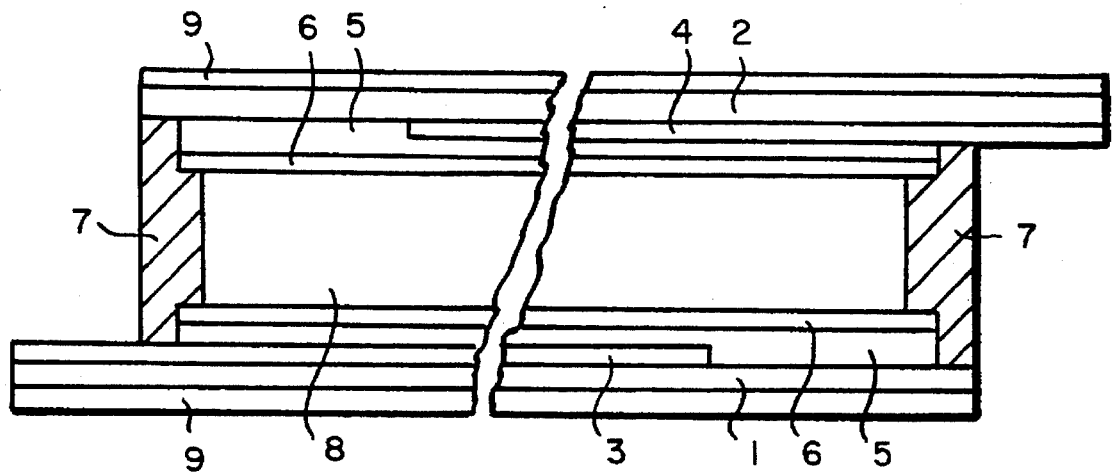
FIG. 1 is a sectional view illustrating a constitution of a ferroelectric liquid crystal device of an embodiment of the present invention.

The compound (a) having an optically active group of the formula (I) defined above, which is used in the ferroelectric liquid crystal device of the present invention, has not been disclosed in any literature.

The optically active group (I) may be cis-form or trans-form. Either form may be applicable to the present invention. Groups of two forms may be used in mixture.

Preferable examples of the compound (a) having the group (I) are those represented by the following formulae (II) and (III):

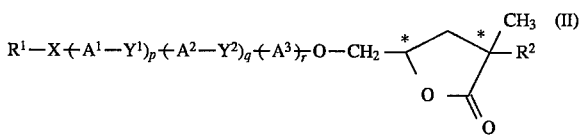

wherein $A^1, A^2, A^3$ are each a group containing a 6-membered ring and having or not having a substituent, $Y^1$ and $Y^2$ are each —COO—, —OCO, —OCH$_2$—, —CH$_2$O—, —CH$_2$CH$_2$—, —CH=CH—, —C≡C— or a single bond, $R^1$ and $R^2$ are each straight-chain or branched-chain alkyl or alkoxy group having 1 to 15 carbon atoms, and p, q and r are each an integer of 0 or 1,

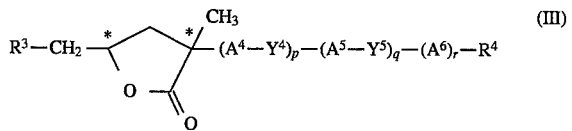

wherein $A^4, A^5, A^6$ are each a group containing a 6-membered ring and having or not having a substituent, $Y^4$ and $Y^5$ are each —COO—, —OCO—, —OCH$_2$—, —CH$_2$O—, —CH$_2$CH$_2$—, —CH=CH—, —C≡C— or a single bond, $R^3$ and $R^4$ are each straight-chain or branched-chain alkyl or alkoxy group having 1 to 15 carbon atoms, and p, q and r are each an integer of 0 or 1.

$R^1$, $R^2$, $R^3$ and $R^4$ in the formulae (II) and (III) each represents an alkyl or alkoxy group having 1 to 15 carbon atoms. Specific examples of the alkyl group include methyl, ethyl, propyl, i-propyl, butyl, i-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methynonyl, undecyl, 1-methyldecyl, dodecyl, 1-methylundecyl and the like. Specific examples of the alkoxy group include methoxy, ethoxy, propoxy, i-propoxy, butoxy, i-butoxy, pentoxy, 1- or 2-methylbutoxy, hexyloxy, 1- or 3-methypentoxy, heptyloxy, 1- or 4-methylhexyloxy, octyloxy, 1-methylheptyloxy, nonyloxy, 1- or 6-methyloctyloxy, decyloxy, 1-methylnonyloxy, undecyloxy, 1-methyldexyloxy, dedocyloxy, 1-methylundecyloxy and the like.

The alkyl or alkoxy group may contain asymmetric carbon(s) in the carbon chains thereof. One or more hydrogen atoms in the alkyl or alkoxy group may be substituted with fluorine, chlorine, bromine, cyano, nitro, trifluoromethyl, methoxy or the like.

Examples of the group containing a 6-membered ring for $A^1$, $A^2$, $A^3$, $A^4$, $A^5$ and $A^6$ in the formulae (II) and (III) include benzene ring, pyridine ring, piperazine ring, cyclohexane ring, dioxacyclohexane ring, bicyclo[2.2.2]octane ring, naphthalene ring and the like. One or more hydrogen atoms in this ring may be substituted with fluorine, chlorine, bromine, cyano, nitro, methyl, methoxy or the like.

The compound represented by the formula (II) may be prepared by reacting an optically active γ-lactone compound represented by the formula (IIa):

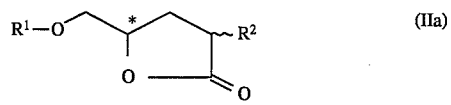

wherein the definitions $R^1$ and $R^2$ are the same as above, with CH$_3$I under the presence of a base. In the reaction, the compound (IIa) is converted by the base (preferably of 1 to 1.5 equivalent amounts) to the corresponding enolate anion which is then reacted with CH$_3$I (preferably of 1 to 5 equivalent amounts) to produce the compound (II).

Preferable examples of the base include lithium diisopropylamide, sodium diisopropylamide, potassium diisopropylamide, lithium 1,1,1,3,3,3-hexamethyldisilazanide sodium 1,1,1,3,3,3-hexamethyldisilazanide, potassium 1,1,1,3,3,3-hexamethyldisilazanide, lithium 1,1,1,3,3,3-hexaethyldisilazanide, sodium 1,1,1,3,3,3-hexaethyldisilazanide, potassium 1,1,1,3,3,3-hexaethyldisilazanide, potassium t-butoxide and the like.

The reaction is conducted in an organic solvent. In the case where potassium t-butoxide is used as the base, t-butyl alcohol is preferable as the organic solvent. In another case, ethers such as tetrahydrofuran, ethyl ether, dimethoxyethane, diethylene glycol dimethyl ether, dioxane or the like; non-protonic solvents such as dimethylformamide, dimethylsulfoxide, dimethylacetamide, hexamethyl phosphoric triamide; or the mixture thereof, may be used as the solvent.

When potassium t-butoxide is used as the base, the reaction is suitably effected at a temperature of 30° to 90° C. for 0.25 to 5 hours. When another base is used, the reaction is completed promptly or within 2 hours at a temperature of −80° to 30° C., depending upon the kind of the base.

The compound (IIa) used as a raw material may be prepared by reacting, in an organic solvent and under the presence of a base, an optically active glycidyl ether represented by the formula (IIb):

with a malonate derivertive represented by the formula (IIc):

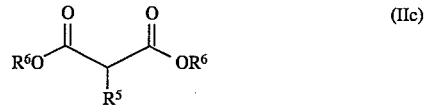

wherein $R^5$ denotes a hydrogen atom or an alkyl group having 1 to 15 carbon atoms and $R^6$ denotes a lower (carbon number of 5 or less) alkyl group.

The above reaction may be completed under reflex for 1.5 to 24 hours using, 1 to 5 equivalent amount of the compound (IIb) with 1 to 5 equivalent amount of the compound (IIc). Preferable examples of the base used for this reaction include sodium methoxide, sodium ethoxide, potassium t-butoxide, sodium hydride, lithium hydride, n-butyl lithium and the like. Preferable examples of the organic solvent include alcohols such as methanol, ethanol, t-butyl alcohol and the like; ethers such as tetrahydrofuran, ethyl ether, dimethoxyethane, diethylene glycol dimethyl ether, dioxane or the like; non-protonic solvents such as dimethylformamide, dimethylsulfoxide, dimethylacetamide, hexamethyl phosphoric triamide and the like; or the mixture thereof.

The glycidyl ether (IIb) may be prepared by reacting an hydroxy compound R¹—OH with optically active epichlorohydrin under the presence of a base.

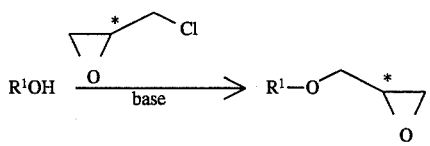

Optically active epichlorohydrin is preferably used at 1 to 10 equivalent amounts to the hydroxy compound in this reaction. The base is preferably used at 1 to 5 equivalent amounts. Examples of the base include sodium hydroxide, potassium hydroxide, potassium t-butoxide and the like. This reaction may be conducted without using any catalyst, but a catalyst of quaternary ammonium salt such as benzyltriethylammonium chloride, benzyltriethylammonium bromide, benzyltrimethylammonium chloride, benzyltrimethylammonium bromide or the like may be used at 0.01 to 0.1 equivalent amounts to the hydroxy compound. The reaction may be effected by using epichlorohydrin as a solvent as it is, but may be effected in an polar organic solvent such as dimethylformamide, dimethylsulfoxide, dimethylacetamide, acetonitrile, t-butyl alcohol, water or the like. The reaction may be completed within 0.5 to 3 hours at a temperature of 50° to 80° C.

On the other side, the compound represented by the formula (III) may be prepared such a method as illustrated by the following scheme.

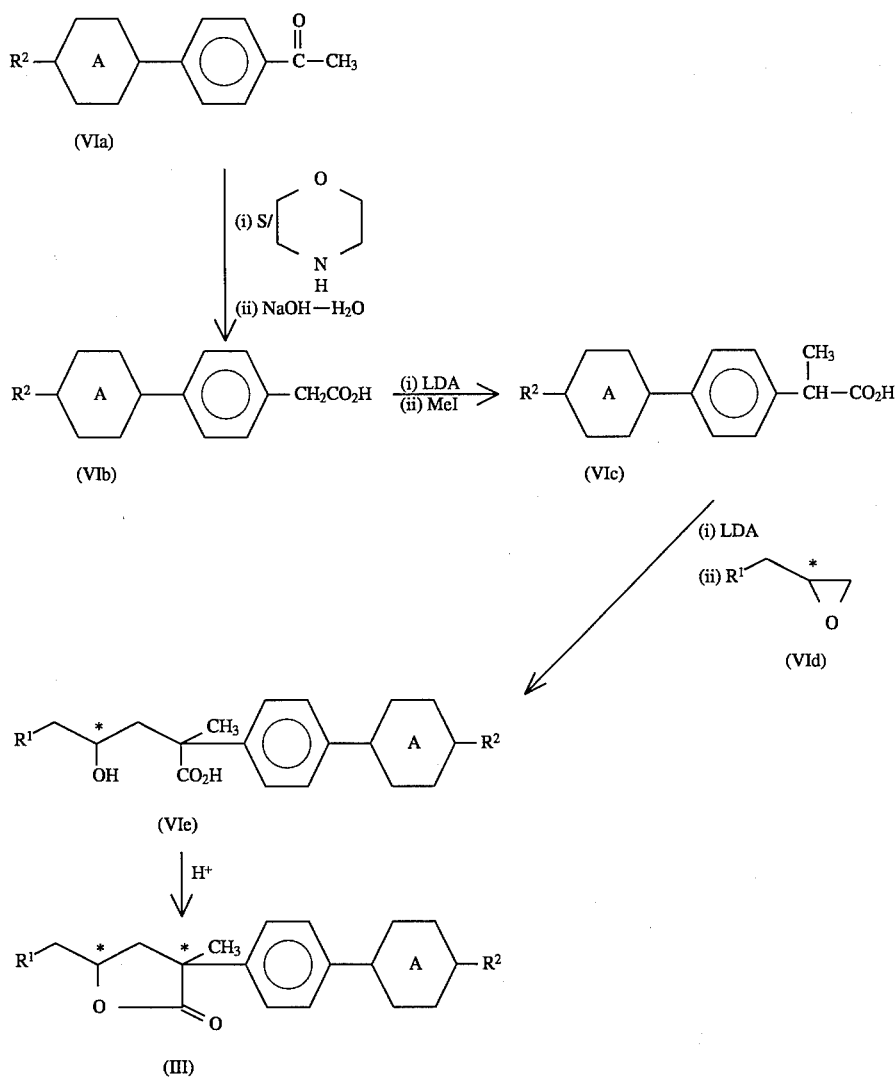

First, an acetophenone derivative (IVa) synthsised by a customary manner is subjected to Willgerodt reaction to produce a phenylacetic acid derivative (VIb) which is then subjected to the reaction with lithium diisopropylamide (LDA) followed by the raction with methyl iodide (MeI) to produce a phenylmethylacetic acid derivative (IVc). The derivative (IVc) is then reacted with lithium diisopropylamide (LDA) of double molar ratio at −30° to +10° C. followed by an optically active epoxy compound (VId) of 0.3 to 3 molar ratio at −78° C. to room temperature, so that an addition compound (VIe) is produced. The compound (VIe) is then subjected to intramolecular dehydrogenation in solvent such as benzene or toluene under the presence of acid catalyst such as sulfuric acid, hydrochloric acid or p-toluenesulfonic acid to obtain the compound represented by the formula (III) which is an optically active γ-lactone derivative.

The compound (VId)-(1) in which $R^1$ in the optically active epoxy compound (VId) is an alkyl group may be obtained by the following reaction.

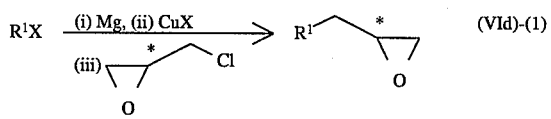

wherein $R^1$ represents an alkyl group, * represents an asymmetric carbon atom and X represents a halogen atom.

In this scheme, the reaction of the alkyl halide or halogenated alkenyl ($R^1X$) with magnesium produces Grignard's reagent which is then reacted with optical active epichlorohydrin under the presence of copper halide (CuX) to produce the optically active epoxy compound (VId)-(1).

In the optically acitive epoxy compound (VId), the compounds (VId)-(2) wherein $R^1$ is an alkyloxy group may be obtained by the following reaction.

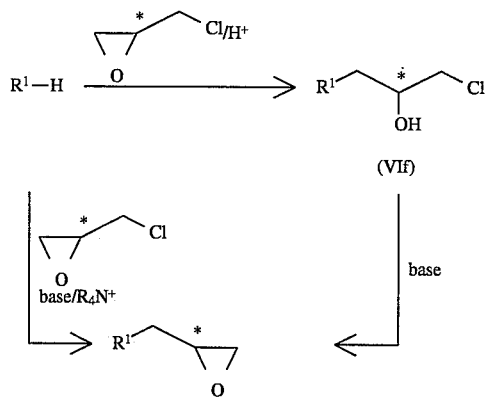

wherein $R^1$ represents an alkoxy group, and * represents an asymmetric carbon atom.

That is, the reaction may be effected by two steps or a single step method. The two step method is conducted by such a manner that an alcohol ($R^1$—H) is caused to react with optically active epichlorohydrine under the presence of an, acidic catalyst to synthesize chlorohydrine ether (VIf) which is then subjected to cyclization with alkali. The single step method is carried out in such a manner that the alcohol is reacted with optically active epichlorohydrine and a base under the presence of quaternary ammonium salt catalyst.

The abovesaid optically active epoxy compound (VId) may also be produced by a method of utilizing the reaction of olefin with air by the use of microorganism.

The optical active epichlorohydrine may be employed of high purity as obtained by the method disclosed in Japanese Unexamined Patent Publication Nos.SHO 61-132196 and 62-6697.

In the ferroelectric liquid crystal device, the liquid crystal layer is required not only to show a higher response in operation but also to exhibit a mono-domain of ferroelectric liquid crystal phase such as smectic C phase. Typically, such a mono-domain can be developed by using a liquid crystal having a phase sequence of INAC and a longer helical pitch in nematic phase.

The compounds represented by the formulae (II) and (III) may include those not exhibiting any liquid crystal phase. Even when exhibiting liquid crystal phase, the compounds are not necessarily pratical alone in a view point of the temperature range in which the liquid crystal phase sequence or smectic C phase is exhibited, so that the compound (II) or (III) may be preferably used with other liquid crystal compounds in comparison with being solely used. Particularly, the compound (II) or (III) may suitably be added at a proper amount into a smectic liquid crystal compound or composition (host liquid crystal) which consists of at least one liquid crystal compound (c) exhibiting a smectic C phase, to thereby provide a ferroelectric liquid crystal composition having a larger spontaneous polarization and showing a high-speed response. In this case, the addition amount of the compound (II) or (III) is preferably 0.1 to 30 wt % and more preferably 0.5 to 10 wt %. When the addition amount is more than 30 wt %, it may often lead to practical problems that the compound added is crystalized in the ferroelectric liquid crystal composition or upper limit temperature of smectic C phase is lowered, while when the addition is less than 0.1 wt %, a sufficient effect cannot be developed in response speed.

A relationship between spontaneous direction derivating the compound (II) or (III) being added in a host liquid crystal and the spiral pitch of nematic phase thereof is as shown in Table 1.

TABLE 1

| Compounds | Direction of spontaneous polarization | Direction of spiral of nematic phase |
|---|---|---|
| Compound (II) | − | L |
|  | + | R |
| Compound (III) | + | L |
|  | − | R |

Using the compound (II) in combination with the compound (III) enables the directions of spontaneous polarization to be identical with each other and also the spiral pitches of nematic phase to be reversed to each other, resulting in that increase of spontaneous polarization and improvement of response can largely be expected and excellent orientation property can be obtained. Therefore, the combination use of the compounds (II) and (III) in the host liquid crystal is preferable embodiment of the present invention. In this embodiment, either the compound (II) or the compound (III) function as a compound (b) of the present invention. The same effect is obtained by using, in the host liquid crystal, either the compound (II) or (III) with the other compound (b) which is reverse to the compound (II) or (III) in the direction of a helical pitch induced in a nematic phase.

Compounds conventionally known as a liquid crystal material (see e.g., 15th Liquid Crystal Forum Report (1989), pp.10–11; Ferroelectrics (1988), vol.185, pp.351–359; Mol. Cryst. Liq. Cryst. (1986), vol.141, pp.251–266) can be suitably selected and used as the compound (b).

The followings are examples of the combination of the compound (a) and the compound (b) which is identical to the compound (a) in the direction of spontaneous polarization but reverse thereto in the direction of a helical pitch.

(i) A combination of the compound (II) and the compound (III) which is identical to the compound (II) in the direction of spontaneous polarization but reverse thereto in the direction of a helical pitch.

(ii) A combination of the compound (II) and at least one compound other than the compounds (II) and (III), this compound being identical to the compound (II) in the direction of spontaneous polarization but reverse thereto in the direction of a helical pitch.

(iii) A combination of the compound (III) and at least one compound other than the compounds (II) and (III), this compound being identical to the compound (III) in the direction of spontaneous polarization but reverse thereto in the direction of a helical pitch.

As the liquid crystal compound (c) such known compound may be applied as represented by the following general formulae (VII) to (IX):

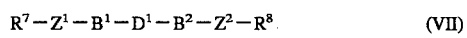

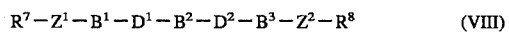

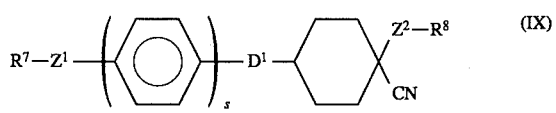

wherein $B^1$, $B^2$ and $B^3$ independently represent a six membered cyclic ring such as benzene ring, cyclohexane ring, bicyclo[2.2.2]octane ring, pyridine ring, pyrimidine ring, pyrazine ring, dioxacyclohexane ring, and naphthalene ring, provided that hydrogen atoms in the ring may be substituted with fluorine atom, chlorine atom, bromine atom, cyano group, nitro group, methyl group, methoxy group, trifluoromethyl group or the like. $D^1$ and $D^2$ each represents a single bond, or a group of —COO—, —OCO—, —CH=CH—, —C≡C—, —CH=CH—COO—, —OCO—CH=CH—, —CH$_2$CH$_2$—, —OCH$_2$—, —CH$_2$O—, —COS— or —SCO—, $Z^1$ and $Z^2$ each represents a single bond or a group of —COO—, —OCO—, —O—, —S—, —OCOO— or —CO—. $R^7$ and $R^8$ each represents an alkyl group with straight or branched chain having 1 to 15 carbon atoms which may contain an asymmetic carbon atom and may be substituted with fluorine atom, chlorine atom, bromine atom, cyano group, nitro group, methoxy group, trifluoromethyl group or the like. s represents an interger of 1 or 2.]

Among them, the pyrimidine compound represented by the formula (IV):

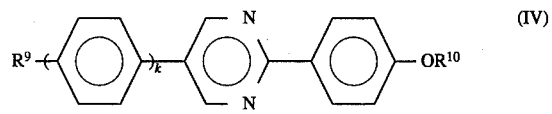

wherein $R^9$ and $R^{10}$ each represents an alkyl or alkoxy group having 1 to 15 carbon atoms and k denotes an integer of 0 or 1, and the compound represented by the formula (V):

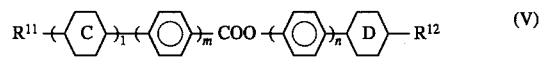

wherein $R^{11}$ and $R^{12}$ each represents an alkyl or alkoxy group having 1 to 15 carbon atoms with straight or branched-chain,

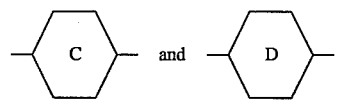

each represents a group

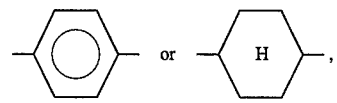

l, m and n each denotes an integer of 0 or 1, provided that the total of l, m and n is 1, 2 or 3, are liable to stably exhibit a smectic C phase and therefore may preferably be used in combination with the compounds (II) and/or (III) to produce a ferroelectric liquid crystal composition of good property.

The above-mentioned compounds (VII) to (IX), (IV) and (V) are disclosed in the following known documents:

(1) Mol. cryst. Liq. cryst., 1986, Vol.133, pp.223–233,
(2) Ferroelectrics, 1988, Vol.85, pp.393–403,
(3) Ferroelectrics, 1988, Vol.85, pp.329–349 and
(4) Ferroelectrics, 1988, Vol.85, pp.385–392

Next, examples of the ferroelectric liquid crystal device of the present invention will be detailed.

FIG. 1 is a sectional view illustrating an example of a ferroelectric liquid crystal device of the present invention using a ferroelectric liquid crystal composition.

FIG. 1 shows an example of transmission type display device, where indicated at 1 and 2 are insulating substrates; at 3 and 4 are conductive films, at 5 is an insulating film; at 6 is an orientation control layer; at 7 is a sealant; at 8 is a ferroelecric liquid crystal composition layer; and at 9 is a polarizer.

Photo-transmission substrates are used for the insulating substrates 1 and 2, and generally glass substrates are employed therefor.

The conductive films 3 and 4, which are usualy composed of a conductive thin films of In$_2$O$_3$, SnO$_2$ or ITO (Indium-Tin Oxide), are used as transparent electrodes and are each formed with a predetermined pattern on the insulating substrates 1 and 2.

On the substrates are each formed an insulating film 5, but the film 5 may be omitted in some cases. As the insulating film 5, there may be used, for example, an inorganic thin film such as of SiO$_2$, SiN$_x$, Al$_2$O$_3$, etc., and an organic thin film such as of polyimide, photoresist resin, polymer liquid crystal, etc. In the case that the insulating film 5 is composed of an,inorganic thin film, the film 5 may be formed by vacuum deposition process, sputtering process, CVD (Chemical Vapor Deposition) process or solution coating process. In the case that the insulating film 5 is composed of an organic thin film, the film 5 may be formed by using a solution dissolving an organic substance or a solution of its precursor according to spin-coating process, immersion application process, screen printing process or roller application process and curing it at suitable conditions (heating, photoirradiation, etc.); the thin film may also be formed by LB (Langumuir-Blodgett) process as well as deposition process, sputtering process, CVD process.

On the insulating film 5 is formed an orientation control layer 6. In the case where the insulating film 5 is omitted, the orientation control layer 6 may be formed directly on the conductive films 3 and 4. As the orientation control layer 6, inorganic layer may be used in some cases, while organic layer may be also used in other cases.

In the case where an inorganic orientation control layer is used, oblique deposition of silicone oxide is commonly employed for the formation thereof. Rotating deposition may be also conducted. In the case where an organic orientation control layer is employed, nylon, polyvinylalcohol, polyimide and the like may be used. In this case, rubbing treatment is usually effected on the layer. The orientation control layer can also be formed by using a polymer liquid crystal or LB membrane with an intended orientation, by using magnetic field orientating technique or by using spacer edge method. Further, $SiO_2$, $SiN_x$ and the like may be formed by deposition process, sputtering process, CVD process and the like, on which rubbing treatment is effected for providing the orientation control layer.

The two insulating substrates are laminated together through a predetermined clearance, and then the liquid crystal composition is injected therebetween to produce a ferroelectric liquid crystal device.

Figure 2:
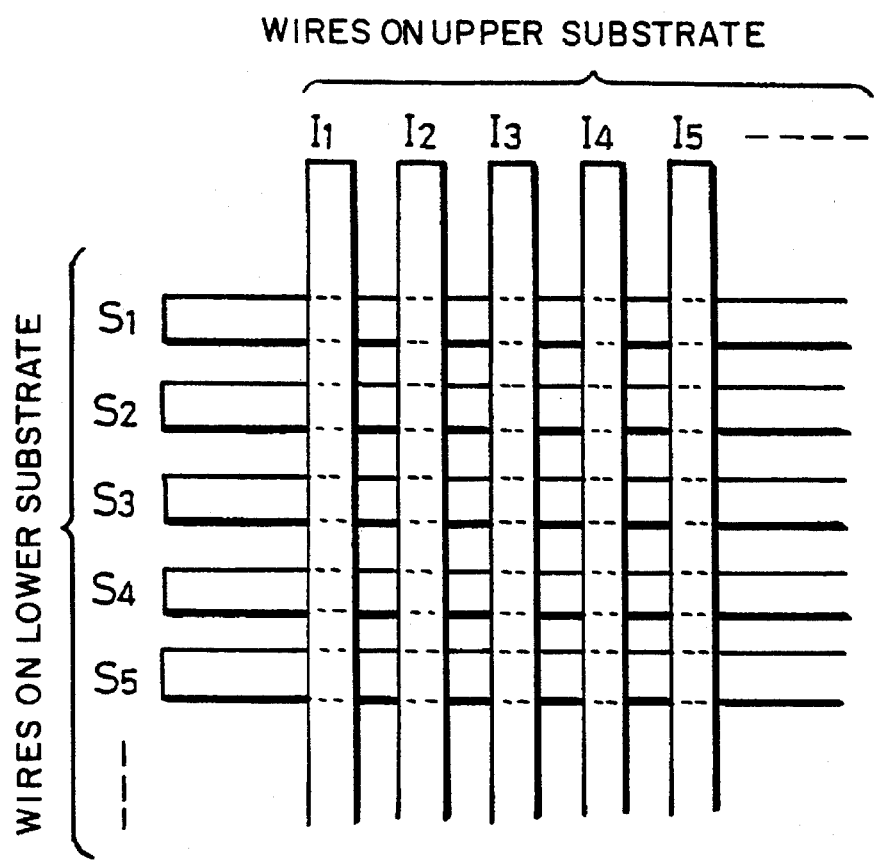
FIG. 2 is a plan view illustrating a constitution of a large capacity ferroelectric liquid crystal device of another embodiment of the present invention.

In FIG. 1, although the ferroelectric liquid crystal device of the present invention is explained as a switching element with one pixel, the ferroelectric liquid crystal device of the present invention may be also applied to a display device with a large capacity matrix wherein the wirings (electrodes) on the upper substrate together with the wirings (electrodes) on the lower substrate are intersectionally placed as to provide a matrix type device structure, as is shown in a plane schematic view of FIG. 2. Such a matrix-type liquid crystal device may be driven by various driving methods which have been proposed currently [See for example, Wakita, Kamimura, Onishi, Oba, Kobayashi, Ota,National Technical Report, 33, 44 (1987)].

REFERENCE EXAMPLE (Synthesis of compounds of the general formula(II))

Production of Intermediate 1

2.50 g of a phenol derivative represented by the following formula:

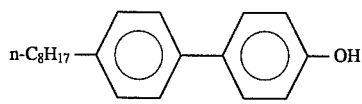

4.25 g of R-(−)-epichlorohydrin (chemical purity: 98.5% or more, optical purity: 99% or more) and 20 mg of benzyltriethylammonium chrolide were dissolved in 3 ml of dimethylformamide. To the solution was added dropwise 24% by weight sodium hydroxide aqueous solution (1.2 equivalents) at 60° C. The reaction was conducted for 40 minutes at the same temperature, and then the reaction mixture was cooled to room temperature followed by extraction with ether. After evaporating the solvent at reduced pressure, the residue was purified by a silica gel column chromatography to obtain 1.62 g of a S-isomer of glycidyl ether represented by the following formula (Intermediate 1).

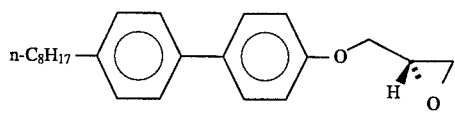

mp: 90° C.
$[\alpha]D^{25}$: +4.44° (C=1.01, $CH_2Cl_2$)
NMR($CDCl_3$) δ: 0.50–3.00 (19H, m) 3.10–3.50 (1H, m) 3.80–4.30 (2H, m) 6.75–7.60 (8H, m)

Production of Intermediate 2

5.28 g of a phenol derivative represented by the following formula:

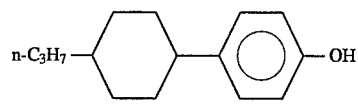

11.55 g of S-(+)-epichlorohydrin (chemical purity: 98.5% or more, optical purity: 99% or more), 3.00 g of potassium tert-butoxide and 45 ml of tert-butyl alcohol were mixed and stirred for 3 hours at 60° C. After evaporating the solvent from the reaction mixture at reduced pressure, the resultant was subjected to extraction with chloroform followed by evaporation of the solvent. The residue was purified by a silica gel column chromatography to obtain 5.82 g of a R-isomer of glycidyl ether represented by the following formula (Intermediate 2).

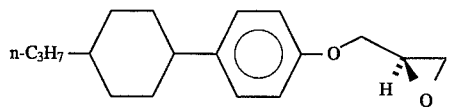

$[\alpha]D^{31}$: −5.71° (C=1.66, $CH_2Cl_2$)
NMR($CDCl_3$) δ: 0.60–2.50 (17H, m) 2.60–2.95 (2H, m) 3.15–3.60 (1H, m) 3.80–4.30 (2H, m) 6.76 (2H, d, J=8.4 Hz) 7.07 (2H, d, J=8.4 Hz)

Production of Intermediate 3

406 mg of the optical active glycidyl ether obtained in Production of Intermediate 2, i.e. (R)-2,3-epoxypropyl 4-(trans-4-n-propylcyclohexyl)phenyl ether, 181 mg of potassium tert-butoxide, 666 mg of dimethyl nonylmalonate and 3 ml of tert-butyl alcohol were mixed and refluxed for 2 hours under stirring. The reaction mixture was allowed to cool to room temperature. After 4N-hydrochloric acid was added dropwise to the mixture to adjust the pH to 1, the mixture was subjected to extraction with chloroform three times and washed once with saturated brine followed by evaporation of the solvent at reduced pressure. The residue was purified with a silica gel column chromatography to obtain two lactone derivatives, i.e., a (2R, 4R)-isomer of the following formula (79 mg) and the corresponding (2S, 4R) isomer-(153 mg) (Intermediate 3).

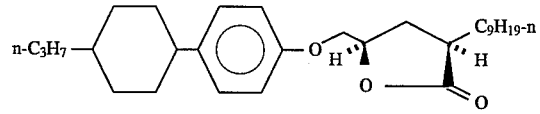

[(2R, 4R)-isomer]

Phase transition temperature: C $\xrightarrow{113° C.}$ I $[\alpha]D^{32}$: −31.45° (C=1.43, $CH_2Cl_2$)
NMR($CDCl_3$) δ: 0.60–3.00 (39H, m) 4.0–4.2 (2H, m) 4.4–4.95 (1H, m) 6.76 (2H, d, J=8.0 Hz) 7.10 (2H, d, J=8.0 Hz)

IR(KBr) 1762 cm$^{-1}$

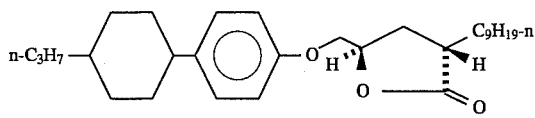

[(2S, 4R)-isomer]

Phase transition temperature: C $\xrightarrow{127° C.}$ I $[\alpha]D^{28}$: −23.48° (C=1.03, CH$_2$Cl$_2$)

NMR(CDCl$_3$) δ: 0.65–3.00 (39H, m) 4.0–4.2 (2H, m) 4.6–5.0 (1H, m) 6.76 (2H, d, J=8.0 Hz) 7.10 (2H, d, J=8.0 Hz)

IR(KBr) 1762 cm$^{-1}$

Production of Intermediate 4

370 mg of the S-isomer of glycidyl ether obtained in Production of Intermediate 4, 442 mg of diethyl n-propylmalonate, 134 mg of potassium tert-butoxide and 3 ml of tert-butyl alcohol were mixed and refluxed for 10 hours under stirring. The reaction mixture was allowed to cool to room temperature. After 4N-hydrochloric acid was added dropwise to the mixture to adjust the pH to 1, the mixture was washed with water and treated with methanol to give white crystals. The crystals were purified by a silica gel chromatography to obtain two γ-lactone derivatives, i.e., a (2S, 4S)-isomer of the following formula (240 mg) and the corresponding (2R, 4S)-isomer (140 mg)(Intermediate 4).

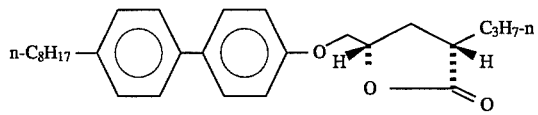

[(2S, 4S)-isomer]

Phase transition temperature: C $\xrightarrow{115° C.}$ I $[\alpha]D^{26}$: +32.67° (C=1.081, CH$_2$Cl$_2$)

NMR(CDCl$_3$) δ: 0.70–3.00 (27H, m) 4.00–4.25 (2H, m) 4.40–4.85 (1H, m) 6.60–7.60 (8H, m)

IR(KBr) 1762 cm$^{-1}$ (C=O)

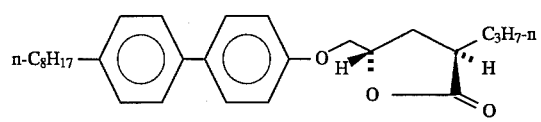

[(2R, 4S)-isomer]

Phase transition temperature: C $\xrightarrow{117° C.}$ I $[\alpha]D^{26}$: +22.50° (C=0.504, CH$_2$Cl$_2$)

NMR(CDCl$_3$) δ: 0.70–3.00 (27H, m) 4.00–4.25 (2H, m) 4.50–5.00 (1H, m) 6.60–7.60 (8H, m)

IR(KBr) 1762 cm$^{-1}$ (C=O)

Synthetic Example 1

To a solution of lithium diisopropylamide prepared by a customary method from 95 mg of diisopropylamine, 0.52 ml of n-butyl lithium (1.5 mol/l in n-hexane) and 2 ml of tetrahydrofuran was added 138 mg of hexamethyl phosphoric triamide at −78° C. To the resultant was added dropwise a tetrahydrofuran solution (5 ml) containing 269 mg of the mixture of the γ-lactone derivatives of (2S, 4S)-isomer and (2R, 4S)-isomer which had been obtained in Production of Intermediate 4. The resultant was stirred for 40 minutes at the same temperature before adding dropwise 185 mg of methyl iodide and then further stirred for 2 hours. The reaction mixture was added with a saturated aqueous solution of ammonium chloride, cooled to room temperature and subjected to extraction twice with ether followed by drying on magnesium sulfuric anhydride and evaporating the solvent. The residue was purified by a silica gel column chromatography to obtain γ-lactone derivatives, i.e, a (2S, 4S)-isomer of the following formula (253 mg) and the corresponding (2R, 4S)-isomer (37 mg).

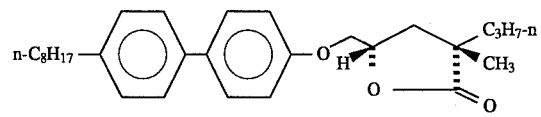

[(2S, 4S)-isomer]

Phase transition temperature: C $\xrightarrow{82.5° C.}$ I $[\alpha]D^{27}$: +28.15° (C=1.058, CH$_2$Cl$_2$)

NMR(CDCl$_3$) δ: 0.85–0.98 (6H, m) 1.18–1.73 (19H,m) 2.00–2.21 (2H, m) 2.62 (2H, t, J=7.70 Hz) 4.04–4.17 (2H, m) 4.71–4.80 (1H,m) 6.93 (2H, d, J=8.79 Hz) 7.21 (2H, d, J=7.33 Hz) 7.44 (2H, d, J=8.06 Hz) 7.49 (2H, d, J=8.79 Hz)

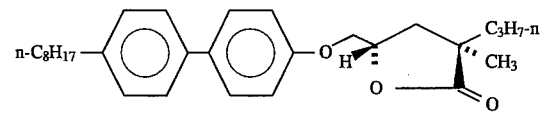

[(2R, 4S)-isomer]

Phase transition temperature: C $\xrightarrow{94.7° C.}$ I $[\alpha]D^{27}$: +20.76° (C=1.247, CH$_2$Cl$_2$)

NMR(CDCl$_3$) δ: 0.86–0.98 (6H, m) 1.27–1.64 (19H, m) 2.03 (1H, dd, J=8.8 Hz, J=12.8 Hz) 2.35 (1H, dd, J=7.5 Hz, J=12.8 Hz) 2.62 (2h, t, J=7.3 Hz) 4.06–4.18 (2H,m) 4.71–4.80 (1H, m) 6.95 (2H, d, J=8.79 Hz) 7.22 (2H, d, J=8.43 Hz) 7.45 (2H, d, J=8.06 Hz) 7.50 (2H, d, J=8.79 Hz)

Synthetic Example 2

The same operation as the Example 1 was made except using 70 mg of diisopropylamine, 0.30 ml of n-butyl lithium (1.5 mol/l in n-hexane), 1 ml of tetrahydrofuran, 100 mg of hexamethyl phosphoric triamide, 130 mg of methyl iodide and a tetrahydrofuran solution (2 ml) containing 163 mg of a mixture of a (2R, 4R)-isomer and a (2S, 4R)-isomer of γ-lactone derivative obtained in Production Intermediate 3, to obtain γ-lactone derivatives, a (2R, 4R)-isomer of the following formula (130 mg) and the corresponding (2S, 4R)-isomer (22 mg).

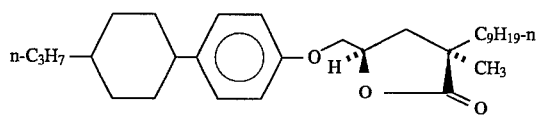

[(2R, 4R)-isomer]

Phase transition temperature: C $\xrightarrow{55°\text{ C.}}$ Sml $\xrightarrow{77°\text{ C.}}$ I $[\alpha]D^{25}$: +25.95° (C=1.013, $CH_2Cl_2$)

NMR($CDCl_3$) δ: 0.87–1.66 (34H, m) 1.85 (2H, s) 1.88 (2H, s) 2.05 (1H, dd, J=6.96 Hz, J=12.45 Hz) 2.17 (1H, dd, J=9.89 Hz, J=12.82 Hz) 2.42 (1H, t, J=12.09 Hz) 4.04–4.15 (2H, m) 4.71–4.81 (1H, m) 6.83 (2H, d, J=8.43 Hz) 7.13 (2H, d, J=8.8 Hz)

(Synthesis of the compound of the formula (III))

Production of Intermediate 5 (Formula (VI d))

(i) Synthesis of (R)-1.2-epoxynonane

A suspension of 1.9 g (10 m mol) of cuprous iodide in 75 ml of ether was placed in a reactor, to which suspension was added Grignard's reagent which had been prepared from 12.38 g (75 m mol) of hexylbromide and 2 g (82.5 m mol) of magnesium in 75 ml of tetrahydrofuran at −30° C. under a nitride gas flow. After stirring for 30 minutes, the suspension was added with 4.63 g of (R)-epichlorohydrin (50 m mol, chemical purity more than 98.5%, optical purity more than 99%, $[\alpha]D^{25}$=−34.0°, C=1.2, methanol) in 100 ml of a mixture of tetrahydrofuran and ether (1:1) and stirred for 2 hours at the same temperature. After completion of the reaction, the reaction mixture was added with 100 ml of saturated aqueous ammonium chloride, cooled to room temperature, subjected to extraction with ether and washed with saturated brine followed by drying the organic layer on magnesium sulfuric anhydride. The residue after evaporating the solvent at reduced pressure was purified by vacuum distillation to obtain 6.29 g of (R)-chlorohydrin (35.2 m mol, 70% yeild) represented by the following formula.

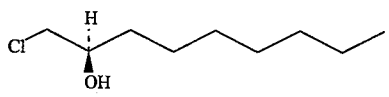

$[\alpha]D^{25}$: +8.20 (neat)

bp: 60°–66° C. (14 mmHg, Kugelrohr)

IR: vmax (neat) 3380 $cm^{-1}$

NMR($CDCl_3$) δ: 0.7–1.8 (15H, m) 2.2 (1H, brd). 3.3–3.9 (3H, m)

A mixture of 4.99 g of the above R-chlorohydrin and 50 ml of 43% aqueous sodium hydroxide was refluxed for 2 hours under stirring. After completion of the reaction, the reaction product was subjected to extraction with ether and the extract was fractionated to obtain 3.97 g of (R)-1,2-epoxy-n-nonane.

$[\alpha]D^{25}$: +10.87°

NMR($CDCl_3$) δ: 0.88 (3H, t) 1.2–1.6 (12H, m) 2.46 (1H, m) 2.74 (1H, m) 2.91 (1H, m)

(ii) Synthesis of R-methylglycidyl ether

To a solution of 0.98 g of sulfuric acid and 100 ml of methanol, the solution having been refluxed under stirring, was added dropwise a solution of 23.66 g of (R)-epichlorohydrin and 20 ml of methanol used in the synthetic example 1 for 20 minutes, and the mixture was refluxed under stirring for 20 minutes. The reaction mixture was then cooled to 10°–15° C., added dropwise with a solution of 31 g of potassium hydroxide in 150 ml of methanol, and stirred for 10 minutes. The reaction mixture was placed in a saturated brine and the product was extracted with methylene chloride. Then, the extract was fractinated (bp 110° C.) to obtain 4.14 g of (R)-methylglycidyl ether.

$[\alpha]D^{28}$: +6.49° (C=1.086, $CH_2Cl_2$)

NMR($CDCl_3$) δ: 2.63 (1H, dd) 2.82 (1H, m) 3.16 (1H, m) 3.34 (1H, dd) 3.42 (3H, S) 3.71 (1H, dd)

(iii) Synthesis of (R)-n-hexylglycidyl ether 6 ml of n-hexanol was added dropwise to a mixture of 40 g of sodium hydroxide, 24 g of (R)-epichlorohydrin as used in Synthetic Example 1 and 400 mg of tetra-butylammonium hydrogensulfate under cooling at 20° to 25° C. The reaction mixture was stirred for 3 hours at the same temperature, to which water was added. The product was extracted with ether, and the extract was purified by vacuum distillation to obtain 3.35 g of (R)-n-hexylglycidyl ether.

$[\alpha]D^{37}$: +2.48° (C=1.048, $CHCl_3$)

bd: 52° C./4 mmHg

NMR($CDCl_3$) δ: 0.89 (3H, m) 1.2–1.4 (6H, m) 1.58 (2H, m) 2.58 (1H, dd) 2.77 (1H, dd) 3.12 (1H, m) 3.36 (1H, dd) 3.48 (2H, m) 3.70 (1H, dd)

(iv) Synthesis of (S)-allylglycidyl ether

To a solution of 0.5 g of sulfuric acid in 100 ml of allyl alcohol, the solution having been refluxed under stirring, was added dropwise a solution of 19.54 g of (S)-epichlorohydrin (more than 98.5% in chemical purity, more than 99% in optical purity ($[\alpha]D^{25}$=+34.0°, C=1.2, methanol)) in 20 ml of allyl alcohol. The mixture was refluxed for further 20 minutes under stirring. The reaction mixture was cooled to 10°–15° C., to which a solution of 25.2 g of potassium hydroxide in methanol (130 ml) was added dropwise for 10 minutes. The reaction mixture was placed in a saturated brine and the product was extracted with methylene chloride and fractionated to obtain 9.51 g of (S)-allylglycidyl ether.

$[\alpha]D^{30}$: −9.24° (C=1.075, $CH_2Cl_2$)

NMR($CDCl_3$) δ: 2.61 (1H, dd) 2.80 (1H, t) 3.16 (1H, m) 3.40 (1H, dd) 3.73 (1H, dd) 4.05 (1H, m) 5.20 (1H, dd) 5.29 (1H, d) 5.91 (1H, m)

Production of Intermediate 6 (Formula (VI b))

(i) Synthesis of 4-(4'-n-heptyl)-biphenyl acetate 10.85 g of 4-acetyl-4'-n-heptylbiphenyl and 2.36 g of sulfur were refluxed in 20 ml of morpholine for 9 hours under stirring. To the reaction mixture was added a solution of 29.5 g of sodium hydroxide, 30 ml of water and 100 ml of ethanol, and the reaction mixture was stirred for 9 hours. Then, the reaction mixture was placed in water, to which hydrochloric acid was added to acidify the medium to precipitate a solid. The solid was then subjected to filteration to obtain 13.51 g of a crude product. The crude product was purified by a silica gel column chromatography to obtain 8.29 g of the objective compound.

mp: 154°–162° C.

IR (Nujol): 1724 cm$^{-1}$

NMR(CDCl$_3$) δ: 0.88 (3H, md) 1.2–1.4 (8H, m) 1.64 (2H, m) 2.63 (2H, t) 3.68 (2H, s) 7.23 (2H, d) 7.33 (2H, d) 7.48 (2H, d) 7.54 (2H, d)

(ii) Synthesis of 4-(4'-n-nonyloxy)-biphenyl acetate 10.14 g of 4-acetyl-4'-n-nonyloxybiphenyl and 1.536 g of sulfur were refluxed in 20 ml of morpholine for 15 hours under stirring. A solution of 25 g of sodium hydroxide, 65 ml of water and 100 ml of ethanol was added to the reaction mixture, which was stirred for 9 hours and then placed in water to be acidified by the addition of hydrochloric acid to obtain a precipitate. The precipitated solid was subjected to filteration to obtain a crude product which was then purified by a silica gel column chromatography to obtain 12.84 g of the objective compound.

mp: 175°–176° C.

IR (Nujol): 1704 cm$^{-1}$

NMR(CDCl$_3$) δ: 0.89 (3H, m) 1.2–1.5 (12H, m). 1.80 (2H, m) 3.69 (2H, s) 3.99 (2H, t) 6.95 (2H, d) 7.33 (2H, d) 7.49 (2H, d) 7.52 (2H, d)

(iii) Synthesis of 4-(4'-n-butyltranscyclohexyl) phenyl acetate 5 g of 4-(4'-n-butyl-trans-cyclohexyl) acetophene and 1.24 g of sulfur were refluxed in 7.5 ml of morpholine for 11 hours under stirring. A solution of 16.75 g of sodium hydroxide, 43.4 ml of water and 67 ml of ethanol was added to the reaction mixture which was then stirred for 7 hours and placed in water to be acidified by the addition of hydrochloric acid. The product was extracted with ether and the crude product extracted was purified by a silica gel column chromatography to obtain 3.33 g of the objective compound.

mp: 72°–74° C.

IR (Nujol): 1718 cm$^{-1}$

NMR(CDCl$_3$) δ: 0.89–1.5 (14H, m) 1.86 (4H, m) 2.44 (1H, t) 3.59 (2H, s) 7.17 (4H, m)

Production of Iintermediate 7 (Formula (IV c))

Synthesis of 2-(4'-nonyloxy-4-biphenyl) propionic acid

In a vessel cooled at –78° C. and containing 506 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a solution of 708 mg of 4-(4'-n-nonyloxy)-biphenyl acetate prepared in Production of Intermediate 6 and 8 ml of tetrahydrofuran, and the mixture was stirred for 1 hour. To the reaction mixture after being cooled to –78° C. was added dropwise a solution of 426 mg of methyl iodide and 2 ml of tetrahydrofuran. The reaction mixture was stirred for 6 hours with temperature being gradually raised to room temperature, and thereafter water was added followed by acidification by hydrochloric acid. The reaction mixture was subjected to extraction with chloroform to obtained 730 mg of the objective compound.

NMR(CDCl$_3$) δ: 0.89 (3h, t) 1.2–1.6 (12H, m) 1.55 (3H, d) 1.80 (2H, m) 3.79 (1H, q) 3.99 (2H, t) 6.95 (2H, d) 7.37 (2H, d) 7.4–7.6 (4H, m)

Synthesis 1 of the compound for liquid crystal composition

In a vessel cooled at –78° C. and containing 113 mg of diisopropylamine and 2 ml of tetrahydrofuran was added dropwise a solution of 15% n-butyllithium in 0.7 ml of hexane. After raising temperature gradually to 0° C., the mixture was stirred for 30 minutes. To the reaction mixture was added dropwise a tetrahydrofuran solution (2 ml) containing 177 mg of 4-(4'-n-nonyloxy)-biphenyl acetate prepared in Production of Intermediate 6, and the mixture was stirred for 1 hour. To the reaction mixture after being cooled to –78° C. was added dropwise a tetrahydrofuran solution (2ml) containing 35 mg of (R)-1,2-epoxynonane prepared in Production of Intermediate 5. The reaction mixture was stirred for 6 hours with temperature being gradually raised to room temperature, and thereafter water was added followed by acidification by hydrochloric acid. The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following γ-lactone derivatives, a (2R, 4R)-isomer (35 mg) and the corresponding (2S, 4R)-isomer (104 mg).

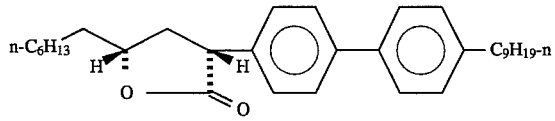

[(2R, 4R)-isomer]

Phase transition temperature: C $\xrightarrow{126° C.}$ I $[\alpha]_D^{34}$: –5.42° (C=1.66, CH$_2$Cl$_2$)

NMR(CDCl$_3$) δ: 0.89 (6H, m) 1.2–1.9 (26H, m) 2.05 (1H, td) 2.74 (1H, ddd) 3.88 (1H, dd) 3.98 (2H, t) 4.48 (1H, m) 6.95 (2H, d) 7.31 (2H, d) 7.48 (2H, d) 7.53 (2H, d)

IR(Nujol): 1750 cm$^{-1}$

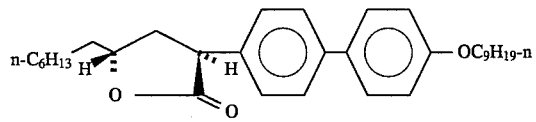

[(2S, 4R)-isomer]

Phase transition temperature: 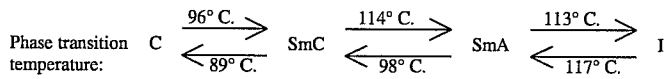

$[\alpha]_D^{34}$: +29.33° (C=0.95, $CH_2Cl_2$)

NMR($CDCl_3$) δ: 0.89 (6H, m) 1.2–1.9 (26H, m) 2.41 (1H, ddd) 2.53 (1H, dt) 3.93 (1H, dd) 3.99 (2H, t) 4.66 (1H, m) 6.96 (2H, d) 7.32 (2H, d) 7.48 (2H, d) 7.53 (2H, d)

IR(Nujol): 1750 $cm^{-1}$

Synthesis 2 of the compound for liquid crystal composition

In a solution cooled at −78° C. and containing 339 mg of diisopropylamine and 6 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (5 ml) containing 531 mg of 4-(4'-n-nonyloxy)-biphenyl acetate prepared in Production of Intermediate 6, and the mixture was stirred for 1 hour. To the reaction mixture after being cooled to −78° C. was added dropwise a tetrahydrofuran solution (1 ml) containing 256 mg of (R)-n-hexylglycidyl ether prepared in Production of Intermediate 5. The reaction mixture was stirred for 6 hours with temperature being gradually raised to room temperature, and thereafter water was added followed by acidification by hydrochloric acid. The product was extracted with chloroform, which extract was added with dry benzene and catalytic suluric acid and stirred for 6 hours under heating with benzene being evaporated gradually. After cooled, the resultant was subjected to vacuum distillation, and then the residue was purified by a silica gel chromatography to obtain the following γ-lactone derivatives, a (2R, 4S)-isomer (259 mg) and the corresponding (2S, 4S)-isomer (207 mg).

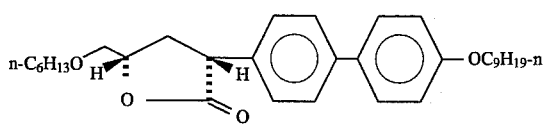

[(2R, 4S)-isomer]

Phase transition temperature: C $\xrightarrow{92°\,C.}$ I $[\alpha]_D^{23}$: +1.36° (C=1.06, $CH_2Cl_2$)

NMR($CDCl_3$) δ: 0.89 (6H, m) 1.2–1.5 (18H, m) 1.58 (2H, m) 1.78 (2H, m) 2.32 (1H, td) 2.66 (1H, ddd) 3.51 (2H, t) 3.61 (1H, dd) 3.70 (1H, dd) 3.89 (1H, dd) 3.97 (2H, t) 4.63 (1H, m) 6.95 (2H, d) 7.23 (2H, d) 7.48 (2H, d) 7.52 (2H, d)

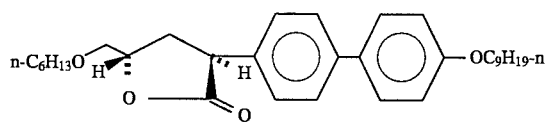

[(2S, 4S)-isomer]

Phase transition temperature: C $\xrightarrow{64°\,C.}$ I $[\alpha]_D^{32}$: +29.27° (C=1.16, $CH_2Cl_2$)

NMR($CDCl_3$) δ: 0.89 (6H, m) 1.2–1.5 (18H, m) 1.58 (2H, m) 1.78 (2H, m) 2.47 (1H, td) 2.65 (1H, ddd) 3.49 (2H, t) 3.59 (1H, dd) 3.63 (1H, dd) 3.97 (2H, t) 4.06 (1H, t) 4.72 (1H, m) 6.94 (2H, d) 7.30 (2H, d) 7.48 (2H, d) 7.52 (2H, d)

Synthesis 3 of the compound for liquid crystal composition

In a vessel cooled at −78° C. and containing 505 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (6 ml) containing 700 mg of 4-(4'-n-heptyl)-biphenyl acetate prepared in Production of Intermediate 6, and the mixture was stirred for 1 hour. To the reaction mixture after being cooled to −78° C. was added dropwise a solution of 260 mg of a commercially available (R)-1,2-epoxyheptane ($[\alpha]_D^{25}$+15.0° <neat>) and 1 ml of tetrahydrofuran. The reaction mixture was stirred for 6 hours with temperature being gradually raised to room temperature, and thereafter water was added followed by acidification by hydrochloric acid. The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following δ-lactone derivatives, a (2R, 4S)-isomer (330 mg) and the corresponding (2S, 4S)-isomer (383 mg).

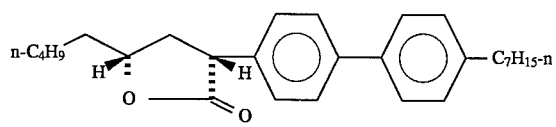

[(2R, 4R)-isomer]

Phase transition temperature: C $\xrightarrow{102°\,C.}$ I $[\alpha]_D^{27}$: −5.66° (C=1.089, $CH_2Cl_2$)

NMR($CDCl_3$) δ: 0.90 (6H, m) 1.2–1.85 (18H, m) 2.08 (1H, dt) 2.63 (2H, t) 2.78 (1H, m) 3.92 (1H, dd) 4.51 (1H, m) 7.25 (2H, d) 7.34 (2H, d) 7.49 (2H, d) 7.57 (2H, d)

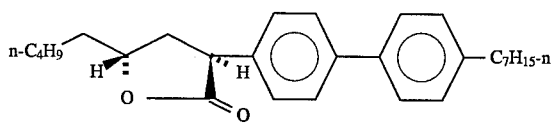

[(2S, 4R)-isomer]

Phase transition temperature: C $\xrightarrow{99° C.}$ I $[\alpha]D^{28}$: +33.48° (C=1.027, CH$_2$Cl$_2$)

NMR(CDCl$_3$) δ: 0.90 (6H, m) 1.2–1.9 (18H, m) 2.35–2.68 (4H, m) 3.94 (1H, dd) 4.67 (1H, m) 7.25 (2H, d) 7.34 (2H, d) 7.48 (2H, d) 7.57 (2H, d)

Synthesis 4 of the compound for liquid crystal composition

In a vessel cooled at −78° C. and containing 505 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (3 ml) containing 600 mg of 4-(4'-n-butyl-trans-cyclohexyl )-phenyl acetate prepared in Production of Intermediate 6, and the mixture was stirred for 1 hour. To the reaction mixture after being cooled to −78° C. was added dropwise a tetrahydrofuran solution (1 ml) containing 275 mg of (S)-allylglycidyl ether prepared in Production of Intermediate 5. The reaction mixture was stirred for 6 hours with temperature being gradually raised to room temperature, and thereafter water was added followed by acidification by hydrochloric acid. The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following -lactone derivatives, a (2S, 4R)-isomer (320 mg) and the corresponding (2R, 4R)-isomer (246 mg).

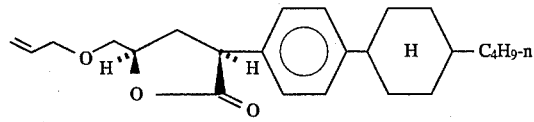

[(2S, 4R)-isomer]

Phase transition temperature: C $\xrightarrow{107° C.}$ I $[\alpha]D^{26}$: −3.22° (C=1.033, CH$_2$Cl$_2$)

NMR(CDCl$_3$) δ: 0.8–1.5 (14H, m) 1.86 (4H, m) 2.30 (1H, dt) 2.45 (1H, m) 2.68 (1H, m) 3.62–3.76 (2H, m) 3.86 (1H, dd) 4.09 (2H, m) 4.65 (1H, m) 5.22 (1H, m) 5.30 (1H, m) 5.91 (1H, m) 7.20 (4H, s)

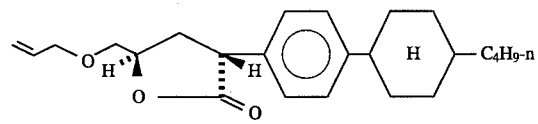

[(2R, 4R)-isomer]

Phase transition temperature: C $\xrightarrow{76° C.}$ I $[\alpha]D^{28}$: −40.42° (C=1.024, CH$_2$Cl$_2$)

NMR(CDCl$_3$) δ: 0.80–1.5 (14H, m) 1.86 (4H, m) 2.37–2.55 (2H, dt) 2.65 (1H, m) 3.60–3.76 (2H, m) 3.95–4.1 (3H, m) 4.75 (1H, m) 5.22 (1H, m) 5.29 (1H, m) 5.91 (1H, m) 7.19 (4H, s)

Synthesis 5 of the compound for liquid crystal composition

In a vessel cooled at −78° C. and containing 505 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (3 ml) containing 600 mg of 4-(4'-n-butyltranscyclohexyl)-phenyl acetate prepared in Production of Intermediate 6, and the mixture was stirred for 1 hour. To the reaction mixture after being cooled to −78° C. was added dropwise a solution of 477 mg of a commercially available (R)-1,2-epoxytridecane ($[\alpha]D^{25}$+9.8° (neat)) and 1 ml of tetrahydrofuran. The reaction mixture was stirred for 6 hours with temperature being gradually raised to room temperature, and thereafter water was added followed by acidification by hydrochloric acid. The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following γ-lactone derivatives, a (2S, 4R)-isomer (320 mg) and the corresponding (2R, 4R)-isomer (246 mg).

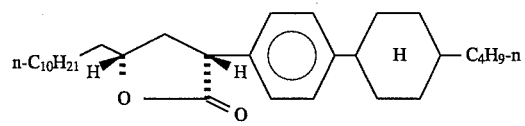

[(2R, 4R)-isomer]

Phase transition temperature: C $\xrightarrow{116° C.}$ I $[\alpha]D^{28}$: −3.57° (C=1.035, CH$_2$Cl$_2$)

NMR(CDCl$_3$) δ: 0.8–1.9 (41H, m) 2.02 (1H, dt) 2.45 (1H, m) 2.72 (1H, m) 3.83 (1H, dd) 4.47 (1H, m) 7.20 (4H, s)

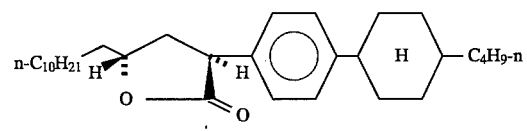

[(2S, 4R)-isomer]

Phase transition temperature: C $\underset{50° C.}{\overset{71° C.}{\rightleftarrows}}$ Xn $\underset{109° C.}{\overset{113° C.}{\rightleftarrows}}$ I $[\alpha]D^{24}$: +31.02° (C=1.038, CH$_2$Cl$_2$)

NMR(CDCl$_3$) δ: 0.80–1.9 (41H, m) 2.28–2.55 (3H, m) 3.87 (1H, dd) 4.62 (1H, m) 7.19 (4H, s)

Synthesis 6 of the compound for liquid crystal composition

In a vessel cooled at −78° C. and containing 505 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (3 ml) containing 700 mg of 4-(4'-n-heptyl)-biphenyl acetate prepared in Production of Intermediate 6, and the mixture was stirred for 1 hour. To the reaction mixture after being cooled to −78° C. was added dropwise a solution of 212 mg of (R)-methylglycidyl ether and 1 ml of tetrahydrofuran. The reaction mixture was stirred for 6 hours with temperature being gradually raised to room temperature, and thereafter water was added followed by acidification by hydrochloric acid. The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following γ-lactone derivatives, a (2R, 4S)-isomer (113 mg) and the corresponding (2S, 4S)-isomer (255 mg).

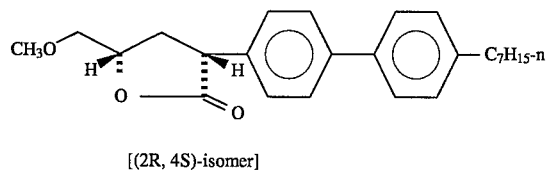

[(2R, 4S)-isomer]

Phase transition temperature: C $\xrightarrow{68°\ C.}$ I

[α]$D^{21}$: +0.35° (C=1.01, CH$_2$Cl$_2$)

NMR(CDCl$_3$) δ: 0.88 (3H, m) 1.2–1.45 (8H, m) 1.65 (2H, m) 2.34 (1H, dt) 2.6–2.8 (3H, m) 3.46 (3H, s) 3.67 (2H, s) 3.94 (1H, dd) 4.67 (1H, m) 7.25 (2H, d) 7.36 (2H, d) 7.49 (2H, d) 7.58 (2H, d)

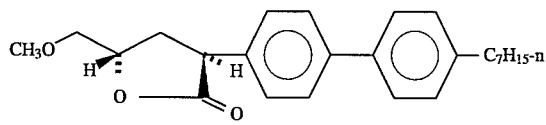

[(2S, 4S)-isomer]

Phase transition temperature: C $\xrightarrow{66°\ C.}$ I

[α]$D^{23}$: +34.16° (C=1.013, CH$_2$Cl$_2$)

NMR(CDCl$_3$) δ: 0.88 (3H, m) 1.2–1.45 (8H, m) 1.65 (2H, m) 2.52 (1H, dt) 2.59–2.75 (4H, m) 3.44 (3H, s) 3.65 (2H, m) 4.08 (1H, t) 4.77 (1H, m) 7.24 (2H, d) 7.33 (2h, d) 7.48 (2H, d) 7.57 (2H, d)

Synthesis 7 of the compound for liquid crystal composition

In a vessel cooled at −78° C. and containing 505 mg of diisopropylamine and 10 ml of tetrahydrofuran was added dropwise a solution of 15% n-butyllithium in 3 ml of hexane. After raising temperature to 0° C., the mixture was stirred for 1 hour. To the reaction mixture was added dropwise a tetrahydrofuran solution (3 ml) containing 682 mg of 4-(4'-n-heptyl)-biphenyl acetate prepared in Production of Initermediate 6, and the mixture was stirred for 1 hour. To the reaction mixture after being cooled to −78° C. was added dropwise a solution of 445 mg of (S)-n-hexylglycidyl ether in 1 ml of tetrahydrofuran. The reaction mixture was stirred for 6 hours with temperature being gradually raised to room temperature, and thereafter water was added followed by acidification by hydrochloric acid. The product was extracted with chloroform, which extract was added with dry benzene and catalytic concentrated sulfuric acid, and stirred for 6 hours under heating with benzene being evaporated gradually. After cooled, the resultant was subjected to vacuum distillation, the residue was purified by a silica gel chromatography to obtain the following γ-lactone derivatives, a (2S, 4R)-isomer (401 mg) and the corresponding (2R, 4R)-isomer (465 mg).

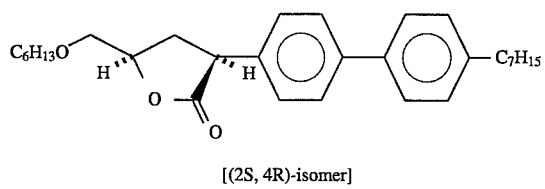

[(2S, 4R)-isomer]

Phase transition temperature: C $\xrightarrow{71°\ C.}$ I

[α]$D^{22}$: −2.17° (C=1.07, CH$_2$Cl$_2$)

NMR(CDCl$_3$) δ: 0.86–0.91 (6H, m) 1.29–1.61 (18H, m) 2.28–2.42 (1H, m) 2.61–2.76 (3H, m) 3.52 (2H, t, J=6.60 Hz) 3.61–3.75 (2H, m) 3.92 (1H, dd, J=9.16, 12.09 Hz) 4.62–4.67 (1H, m) 7.24 (2H, d, J=8.06 Hz) 7.35 (2H, d, J=8.42 Hz) 7.48 (2H, d, J=8.42 Hz) 7.57 (2H, d, J=8.06 Hz)

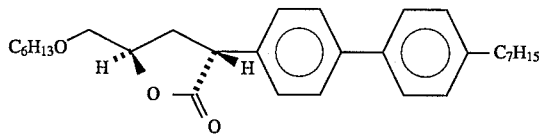

[(2S, 4R)-isomer]

Phase transition temperature: C $\xrightarrow{48°\ C.}$ I

[α]$D^{22}$: −37.95° (C=1.003, CH$_2$Cl$_2$)

NMR(CDCl$_3$) δ: 0.86–0.90 (6H, m) 1.29–1.60 (18H, m) 2.45–2.57 (1H, m) 2.61–2.74 (3H, m) 3.51 (2H, t, J=6.68 Hz) 3.60–3.75 (2H, m) 4.09 (1H, t, J=9.35 Hz) 4.74–4.78 (1H, m) 7.24 (2H, d, J=8.06 Hz) 7.33 (2H, d, J=8.43 Hz) 7.48 (2H, d, J=8.43 Hz) 7.57 (2H, d, J=8.06 Hz)

Synthetic Example 3

In a vessel cooled at −78° C. and containing 505 mg of diisopropylamine and 10 ml of tetrahydrofuran was added dropwise a solution of 15% n-butyllithium in 3 ml of hexane. After raising temperature gradually to 0° C., the mixture was stirred for 30 minutes. To the reaction mixture was added dropwise a tetrahydrofuran solution (8 ml) containing 730 mg of 2-(4'-n-nonyloxy-4-biphenyl) propionic acid prepared in Production of Intermediate product 7, and the mixture was stirred for 1 hour. To the reaction mixture after being cooled to −78° C. was added dropwise a solution of 312 mg of (R)-1,2-epoxynonane (see Production of Intermediate 5) and 1 ml of tetrahydrofuran. The reaction mixture was stirred for 6 hours with temperature being gradually raised to room temperature, and thereafter water was added followed by acidification by hydrochloric acid.

The product was extracted with chloroform, which extract was added with dry benzene and catalytic sulfuric acid, and stirred for 6 hours under heating with benzene being evaporated gradually. After cooled, the resultant was subjected to vacuum distillation, and then the residue was purified by a silica gel chromatography to obtain the following γ-lactone derivatives, a (2R, 4R)-isomer (408 mg) and the corresponding (2S, 4R)-isomer (280 mg).

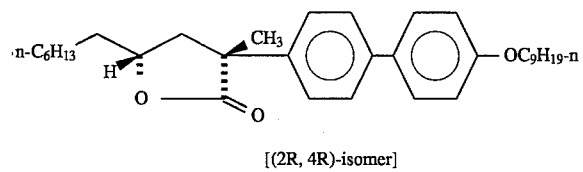

[(2R, 4R)-isomer]

Phase transition temperature: C $\xrightarrow{95°\text{ C.}}$ I $[\alpha]_D^{25}$: +13.24° (C=1.06, $CH_2Cl_2$)

NMR ($CDCl_3$) δ: 0.88 (6H, m) 1.2–1.7 (24H, m) 1.67 (3H, s) 1.79 (2H, m) 2.33 (1H, dd) 2.50 (1H, dd) 3.99 (2H, t) 4.57 (1H, m) 6.96 (2H, d) 7.45–7.55 (6H, m)

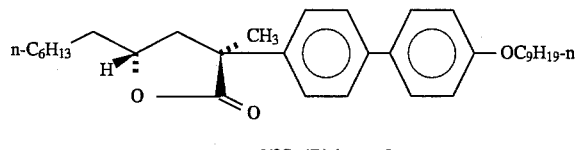

[(2S, 4R)-isomer]

Phase transition temperature: C $\xrightarrow{72°\text{ C.}}$ I $[\alpha]_D^{23}$: +25.11° (C=1.017, $CH_2Cl_2$)

NMR ($CDCl_3$) δ: 0.88 (6H, m) 1.15–1.70 (24H, s) 1.61 (3H, s) 1.78 (2H, m) 1.99 (1H, dd) 2.77 (1H, dd) 3.99 (2H, t) 4.24 (1H, m) 6.96 (2H, d) 7.35–7.60 (6H, m)

EXAMPLES

Liquid crystal compositions were prepared by using the compounds produced in accordance with the aforesaid Synthetic Examples and represented by Nos. 1 to 3 and 14 and 15 of the formula (I), and by Nos. 4 to 13 in Tables 2 and 3.

TABLE 2

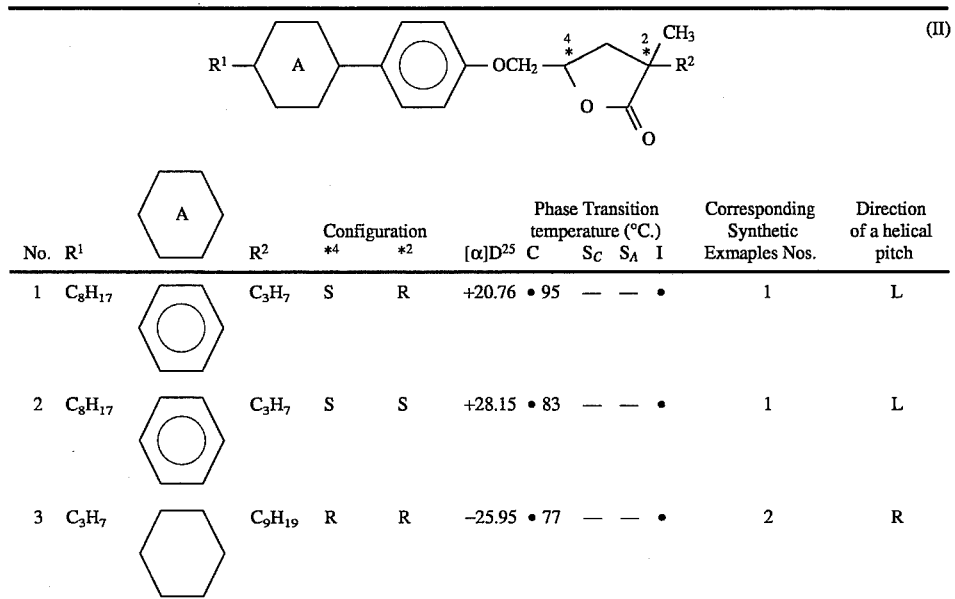

| No. | $R^1$ | A | $R^2$ | Configuration *4 | *2 | $[\alpha]_D^{25}$ | Phase Transition temperature (°C.) C | $S_C$ | $S_A$ | I | Corresponding Synthetic Exmaples Nos. | Direction of a helical pitch |
|---|---|---|---|---|---|---|---|---|---|---|---|---|
| 1 | $C_8H_{17}$ | (cyclohexyl) | $C_3H_7$ | S | R | +20.76 | • 95 | — | — | • | 1 | L |
| 2 | $C_8H_{17}$ | (cyclohexyl) | $C_3H_7$ | S | S | +28.15 | • 83 | — | — | • | 1 | L |
| 3 | $C_3H_7$ | (cyclohexyl) | $C_9H_{19}$ | R | R | −25.95 | • 77 | — | — | • | 2 | R |

TABLE 3

$$R^3-CH_2-\overset{*}{\underset{O}{C}}H-\overset{*}{\underset{\underset{O}{C}}{C}}\overset{X}{\underset{}{-}}\phenyl-A-R^4$$

| No. | $R^3$ | X | A | $R^4$ | Config-uration *4 *2 | $[\alpha]_D$ | Phase Transition temperature (°C.) C $S_C$ $S_A$ I | Corresponding Synthetic Examples Nos. | Direction of a helical pitch |
|---|---|---|---|---|---|---|---|---|---|
| 4 | $C_4H_9-$ | H | ⌬ | $-C_7H_{15}$ | R R | −5.66 | • 102 — — • | 3 (Those for liquid crystal compositions) | L |
| 5 | $C_6H_{13}$ | H | ⌬ | $-OC_9H_{19}$ | R R | −5.42 | • 126 — — • | 1 | L |
| 6 | $C_6H_{13}$ | H | ⌬ | $-OC_9H_{19}$ | R S | +29.33 | • 96 • 114 • 118 • | 1 | L |
| 7 | $C_{10}H_{21}$ | H | H | $-C_4H_9$ | R R | −3.57 | • 116 — — • | 5 | |
| 8 | $CH_3O-$ | H | ⌬ | $-C_7H_{15}$ | S R | +0.35 | • 68 — — • | 6 | L |
| 9 | $C_6H_{13}O-$ | H | ⌬ | $-C_7H_{15}$ | R S | −1.63 | • 71 — — • | 7 | R |
| 10 | $C_6H_{13}O-$ | H | ⌬ | $-C_7H_{15}$ | R R | −37.95 | • 48 — — • | 7 | R |
| 11 | $C_6H_{13}O-$ | H | ⌬ | $-OC_9H_{19}$ | S R | +1.36 | • 92 — — • | 2 | L |
| 12 | $C_6H_{13}O-$ | H | ⌬ | $-OC_9H_{19}$ | S S | +29.27 | • 64 — — • | 2 | L |
| 13 | $CH_2=CH-CH_2O-$ | H | H | $-C_4H_9$ | R S | −3.22 | • 107 — — • | 4 | |
| 14 | $C_6H_{13}-$ | $CH_3$ | ⌬ | $-OC_9H_{19}$ | R R | +13.24 | • 95 — — • | 3 (Synthetic Ex.) | |
| 15 | $C_6H_{13}-$ | $CH_3$ | ⌬ | $-OC_9H_{19}$ | R S | +25.11 | • 72 — — • | 3 | R |

Comparative Example 1

Produced was liquid crystal composition No. 16 of non-chiral smectic C phase shown in FIG. 4.

TABLE 4

Liquid crystal composition No. 16

$$S_C \xrightarrow{51° C.} S_A \xrightarrow{63° C.} N \xrightarrow{69° C.} I$$

| Structure | wt % |
|---|---|
| C$_7$H$_{15}$—(N=N pyrimidine)—(phenyl)—OC$_7$H$_{15}$ | 5% (wt %) |
| C$_7$H$_{15}$—(N=N pyrimidine)—(phenyl)—OC$_8$H$_{17}$ | 10% |
| C$_7$H$_{15}$—(N=N pyrimidine)—(phenyl)—OC$_9$H$_{19}$ | 15% |
| C$_8$H$_{17}$—(N=N pyrimidine)—(phenyl)—OC$_8$H$_{17}$ | 20% |
| C$_8$H$_{17}$—(N=N pyrimidine)—(phenyl)—OC$_{10}$H$_{21}$ | 30% |
| C$_9$H$_{19}$—(N=N pyrimidine)—(phenyl)—OC$_8$H$_{13}$ | 20% |

To the liquid crystal composition No. 16 was added 2 wt % of each of the compounds Nos. 1 to 15 shown in Tables 2 and 3 to form 15 kinds of ferroelectric liquid crystal compositions.

Next, on two glass substrates were each deposited ITO film and further formed SiO$_2$ on which PVA film was coated and rubbing was effected thereover. Then, the two glass substrates were laminated with each other as having 2 μm of cell thickness and the same rubbing direction, and the 15 kinds of ferroelectric liquid crystal compositions corresponding to the compounds Nos. 1 to 15 were each injected between the substrates. After injection of the compositions, the cell was first heated to the temperature enabling to the liquid crystal composition to change to isotropic liquid, and then cooled to room temperature at 1° C./min to obtain a ferroelectric liquid crystal device of good orientation. Properties of the ferroelectric liquid crystal device are as shown in Table 5.

TABLE 5

Properties of Ferroelectric Liquid Crystal Compositions provided by addition of 2 wt % optically active compound into liquid crystal composition No. 16

| Added Compound No. | Phase Transition temperature (°C.) | | | Response speed (μsec) | Tilt angle Θ | Memory angle 2Θ |
|---|---|---|---|---|---|---|
| | S$_C$ | S$_A$ | N | I | | |
| 1 | 50 | 61 | 67 | 116 | 21 | 12 |
| 2 | 48 | 60 | 66 | 90 | 21 | 13 |
| 3 | 45 | 59 | 67 | 101 | 20 | 11 |
| 4 | 52 | 61 | 68 | 100 | 21 | 12 |
| 5 | 52 | 62 | 69 | 138 | 21 | 12 |
| 6 | 53 | 62 | 69 | 325 | 8 | 11 |
| 7 | 51 | 61 | 68 | 750 | 10 | 15 |
| 8 | 50 | 60 | 68 | 139 | 20 | 14 |
| 9 | 52 | 60 | 67 | 146 | 19 | 11 |
| 10 | 51 | 60 | 67 | 230 | 17 | 11 |
| 11 | 53 | 61 | 68 | 132 | 19 | 14 |
| 12 | 53 | 61 | 68 | 214 | 16 | 12 |
| 13 | 49 | 59 | 67 | 236 | 19 | 12 |
| 14 | 50 | 60 | 67 | 266 | 19 | 13 |
| 15 | 47 | 59 | 66 | 124 | 18 | 11 |

The response speed was measured in a time when transmitted light changes by 50% from application of rectangular wave voltage of $V_{p-p}=20$ V.

Working Example 2

The compounds Nos. 1 to 15 shown in Tables 2 and 3 corresponding to the compound (a) or (b), the compounds Nos. 17 to 33, 50 and 61 to 64 shown in Tables 6 and 7 corresponding to the compound (c), the compounds Nos. 81 to 84 and 91 to 94 shown in Tables 11 and 12 corresponding to the compound (c) and the compounds Nos. 34 and 51 to 55 shown in Tables 8 and 8-2 corresponding to the compound (b) were used in combination to prepare the ferroelectric compositions Nos. 35 to 40 shown in Tables 9 and 9-2 as having a sufficiently longer spiral pitch of nematic phase in comparison with cell thickness.

TABLE 6

$$R^9-\left(\bigcirc\right)_k-\underset{N}{\overset{N}{\bigcirc}}-\bigcirc-OR^{10} \quad (IV)$$

| No. | $R^9$ | k | $R^{10}$ | C | $S_X$ | $S_C$ | $S_A$ | N | I |
|-----|-------|---|----------|---|-------|-------|-------|---|---|
| 17 | $C_7H_{15}$ | 0 | $C_7H_{15}$ | • 38 | — | — | • 47 | • 67 | • |
| 18 | $C_7H_{15}$ | 0 | $C_8H_{17}$ | • 49 | — | — | (• 44) | • 70 | • |
| 19 | $C_7H_{15}$ | 0 | $C_9H_{19}$ | • 46 | — | • 51 | • 57 | • 70 | • |
| 20 | $C_8H_{17}$ | 0 | $C_6H_{13}$ | • 28 | — | • 45 | • 58 | • 65 | • |
| 21 | $C_8H_{17}$ | 0 | $C_8H_{17}$ | • 29 | — | • 56 | • 62 | • 68 | • |
| 22 | $C_8H_{17}$ | 0 | $C_{10}H_{21}$ | • 32 | — | • 60 | • 66 | • 70 | • |
| 23 | $C_9H_{19}$ | 0 | $C_6H_{13}$ | • 24 | — | • 43 | • 70 | • 71 | • |
| 24 | $C_9H_{19}$ | 0 | $C_8H_{17}$ | • 33 | — | • 60 | • 76 | — | • |
| 25 | $C_9H_{19}$ | 0 | $C_9H_{19}$ | • 35 | — | • 60 | • 75 | — | • |
| 26 | $C_8H_{17}$ | 1 | $C_5H_{11}$ | • 78 | • 143 | • 167 | • 192 | — | • |
| 27 | $C_8H_{17}O$ | 0 | $CH_2CH_2CHC_2H_5(S)CH_3$ | • 52 | — | • 73 | • 76 | — | • |
| 50 | $C_{11}H_{23}O$ | 0 | $CH_2CH_2CHC_2H_5(S)CH_3$ | • 39 | — | • 75 | • 76 | — | • |

TABLE 7

$$R^{11}-\left(C\right)_l-\left(\bigcirc\right)_m-COO-\left(\bigcirc\right)_n-D-R^{12} \quad (V)$$

| No. | $R^{11}$ | C | l | m | n | D | $R^{12}$ | C | $S_X$ | $S_C$ | $S_A$ | N | I |
|-----|----------|---|---|---|---|---|----------|---|-------|-------|-------|---|---|
| 28 | $C_9H_{19}$ |  | 0 | 1 | 0 | ◯ | $OC_6H_{13}$ | • 43 | — | (• 34) | — | • 62 | • |
| 29 | $C_8H_{17}O$ |  | 0 | 1 | 0 | ◯ | $OC_8H_{17}$ | • 63 | — | • 74 | — | • 91 | • |
| 30 | $C_6H_{13}$ | ⬡ | 1 | 0 | 0 | ◯ | $OC_8H_{17}$ | • 42 | — | — | • 71 | • 78 | • |
| 31 | $C_8H_{17}O$ |  | 0 | 1 | 1 | ⬡ | $C_5H_{11}$ | • 80 | — | • 99 | — | • 182 | • |
| 32 | $C_{10}H_{21}O$ |  | 0 | 1 | 1 | ⬡ | $C_5H_{11}$ | • 73 | — | • 120 | • 127 | • 170 | • |
| 33 | $C_9H_{19}$ |  | 0 | 1 | 1 | ◯ | $OC_8H_{17}$ | • 105 | — | • 153 | — | • 173 | • |

TABLE 7-continued $$R^{11}-\left(\underset{C}{\bigcirc}\right)_l-\left(\bigcirc\right)_m-COO-\left(\bigcirc\right)_n-\underset{D}{\bigcirc}-R^{12} \quad (V)$$

C = cyclohexyl, D = cyclohexyl

| No. | $R^{11}$ | $l$ | $m$ | $n$ | $R^{12}$ | C | $S_X$ | $S_C$ | $S_A$ | N | I |
|---|---|---|---|---|---|---|---|---|---|---|---|
| 61 | $C_8H_{17}O$ | 0 | 1 | 0 (phenyl) | $OC_4H_9$ | •58 | — | •59 | •60 | •89 | • |
| 62 | $C_8H_{17}O$ | 0 | 1 | 0 (phenyl) | $OC_6H_{13}$ | •55 | — | •66 | — | •90 | • |
| 63 | $C_2H_5-CH-CH_2O$<br>$\quad\quad\;\;CH_3$ (recemic) | 0 | 1 | 1 (cyclohexyl) | $C_5H_{11}$ | •97 | — | — | — | •164 | • |
| 64 | $C_5H_{11}$ | 1 (cyclohexyl) | 1 | 0 (phenyl) | $OCH_2-CH-C_2H_5$<br>$\quad\quad\quad\;\;CH_3$ (racemic) | •105 | — | — | •149 | •164 | • |

TABLE 8

| Compounds No. | Structure | Direction of a helical pitch |
|---|---|---|
| 34 | (2S, 4S) $C_8H_{17}$—pyridine—phenyl—$OCH_2\overset{4}{\underset{*}{-}}\underset{O}{\overset{\displaystyle|}{\underset{\|}{C}}}\overset{2}{\underset{*}{-}}C_6H_{13}$ (γ-butyrolactone) | L |

TABLE 8-2

| Compounds No. | Structure | Direction of a helical pitch |
|---|---|---|
| 51 | (2S, 4S) $C_5H_{11}$—cyclohexyl—phenyl—$OCH_2\overset{4}{\underset{*}{-}}\underset{O}{\overset{\displaystyle|}{\underset{\|}{C}}}\overset{2}{\underset{*}{-}}C_4H_9$ | L |
| 52 | (2S, 4S) $C_8H_{17}O$—phenyl—phenyl(F)—$OCH_2\overset{4}{\underset{*}{-}}\underset{O}{\overset{\displaystyle|}{\underset{\|}{C}}}\overset{2}{\underset{*}{-}}C_3H_7$ | L |

TABLE 8-2-continued

| Compounds No. | | Structure | Direction of a helical pitch |
|---|---|---|---|
| 53 | (2S, 4S) | 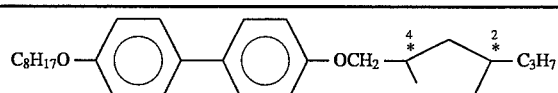C$_8$H$_{17}$O—〇—〇(F)—OCH$_2$—*4—*2—C$_3$H$_7$ (O, O ring) | R |
| 54 | (2S, 4S) | C$_8$H$_{17}$—〇—〇(CN)—OCH$_2$—*4—*2—C$_3$H$_7$ | L |
| 55 | (2S, 4S) | C$_8$H$_{17}$—〇—〇(F)—OCH$_2$—*4—*2—C$_3$H$_7$ | R |

TABLE 9

| | (wt. %) | |
|---|---|---|
| Compounds | Composition No. 35 | Composition No. 36 |
| No. 1 | 1.8 | 1.1 |
| No. 2 | 2.8 | 1.6 |
| No. 9 | 3.2 | 1.9 |
| No. 17 | | 4.1 |
| No. 18 | | 2.1 |
| No. 19 | 6.2 | 10.7 |
| No. 20 | 2.6 | 1.5 |
| No. 21 | 9.7 | 10.3 |
| No. 22 | 13.3 | 7.8 |
| No. 23 | 6.2 | 9.0 |
| No. 24 | 12.4 | 7.3 |
| No. 25 | 12.3 | 25.6 |
| No. 26 | 6.2 | 3.6 |
| No. 27 | 2.6 | 1.5 |
| No. 28 | 3.5 | 2.0 |
| No. 29 | 3.5 | 2.0 |
| No. 30 | 2.6 | 1.5 |
| No. 31 | 3.5 | 2.0 |
| No. 32 | 3.5 | 2.0 |
| No. 33 | 2.6 | 1.5 |
| No. 34 | 1.5 | 2.1 |

TABLE 9-2

| | (wt. %) | | | |
|---|---|---|---|---|
| Compounds | Composition No. 37 | Composition No. 38 | Composition No. 39 | Composition No. 40 |
| No. 1 | | 1.0 | | |
| No. 2 | 0.6 | 0.7 | 2.2 | 0.4 |
| No. 9 | | 1.1 | | |
| No. 15 | 3.0 | 2.0 | | |
| No. 17 | | | | |
| No. 18 | | | | |
| No. 19 | 14.1 | | 6.6 | |
| No. 20 | | | 2.7 | |
| No. 21 | 14.5 | | 10.5 | |
| No. 22 | 24.3 | | 14.7 | |
| No. 23 | 14.6 | | 6.8 | |
| No. 24 | | | 13.3 | |
| No. 25 | | | 12.6 | |
| No. 26 | | | | |
| No. 27 | 4.8 | | 6.2 | |
| No. 28 | | | 3.8 | 25.1 |
| No. 29 | | | 3.7 | 16.4 |
| No. 30 | | | 2.8 | |
| No. 31 | | | 3.4 | |
| No. 32 | | | 3.4 | 7.8 |
| No. 33 | | | 2.5 | |
| No. 34 | | | | |
| No. 50 | | | | 1.5 |
| No. 51 | | | | 1.5 |
| No. 52 | | | 0.8 | |
| No. 53 | | | 2.2 | |
| No. 54 | | | 1.8 | 1.0 |
| No. 55 | | | | 1.0 |
| No. 61 | | | | 11.9 |
| No. 62 | | | | 12.5 |
| No. 63 | | | | 3.8 |
| No. 64 | | | | 3.9 |
| No. 81 | | | | 7.6 |
| No. 82 | | 23.8 | | |
| No. 83 | | 23.8 | | |
| No. 84 | | | | 5.6 |
| No. 91 | | 23.8 | | |
| No. 92 | | 23.8 | | |
| No. 93 | 14.5 | | | |
| No. 94 | 9.6 | | | |

Ferroelectric liquid crystal devices were fabricated similarly with the Example 1 and evaluated in their properties. Tables 10 and 10-2 show phase transition temperature and properties of the ferroelectric liquid crystal composition.

TABLE 10

| | Phase transition temperature (°C.) | | | | Response speed (μsec) | Tilt angle Θ(deg) | Memory angle 2Θ(deg) | Spontaneous polarization (nC/cm$^2$) |
|---|---|---|---|---|---|---|---|---|
| No. | S$_C$ | S$_A$ | N | I | | | | |
| 35 | 58 | 69 | 72 | | 33 | 24 | 17 | −22.4 |

TABLE 10-continued

| No. | Phase transition temperature (°C.) | | | | Response speed (μsec) | Tilt angle Θ(deg) | Memory angle 2Θ(deg) | Spontaneous polarization (nC/cm²) |
|---|---|---|---|---|---|---|---|---|
| | $S_C$ | $S_A$ | N | I | | | | |
| 36 | 55 | 67 | 72 | | 58 | 24 | 14 | −14.1 |

TABLE 10-2

| No. | Phase transition temperature (°C.) | | | | Response speed (μsec) | Tilt angle Θ(deg) | Memory angle 2Θ(deg) | Spontaneous polarization (nC/cm²) |
|---|---|---|---|---|---|---|---|---|
| | $S_C$ | $S_A$ | N | I | | | | |
| 37 | 64 | 83 | 89 | | 61 | 22 | | −6.3 |
| 38 | 68 | 83 | 86 | | 72 | 24 | | −9.9 |
| 39 | 55 | 71 | 77 | | 51 | 25 | | −11.3 |
| 40 | 44 | 72 | 90 | | 123 | 21 | | −7.4 |

The ferroelectric liquid crystal devices has a longer spiral pitch of nematic phase to thereby achieve good orientation and high speed response, so that they are applicable to a ferroelectric liquid crystal device of a large capacity.

What is claimed is:

1. A ferroelectric liquid crystal device having a pair of substrates each provided with voltage applying means, an orientation control layer formed on at least one of the substrates, and a layer of ferroelectric liquid crystal composition disposed between the pair of substrates, the ferroelectric liquid crystal composition comprising at least one compound (a) having an optically active group of formula (I):

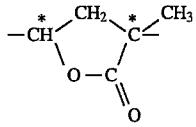

at least one compound (b) which is reverse to the compound (a) in the direction of a helical pitch induced in a nematic phase and at least one liquid crystal compound (c) exhibiting a smectic C phase, the liquid crystal composition exhibiting at least a smectic C phase, smectic A phase and nematic phase, wherein the ferroelectric liquid crystal composition comprises the optically active compounds (II) and (III):

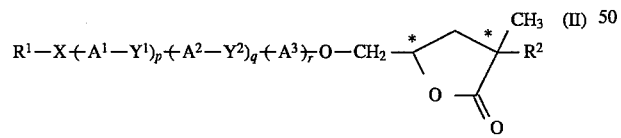

wherein $A^1$, $A^2$, $A^3$ are each a group containing a 6-membered ring having group selected from the group consisting of benzene, piperazine, cyclohexane, dioxacyclohexane and naphthalene, each of which is unsubstituted or substituted with one or more substituents of fluorine, chlorine, bromine, cyano, nitro, methyl or methoxy, X is —O—, —COO—, —OCO— or a single bond, $Y^1$ and $Y^2$ are each —COO—, —OCO—, —OCH$_2$—, —CH$_2$O—, —CH$_2$CH$_2$—, —CH=CH—, —C≡C— or a single bond, $R^1$, $R^2$ are each straight-chain or branched-chain alkyl or alkoxy group having 1 to 15 carbon atoms, and p, q and r are each an integer of 0 to 1, and

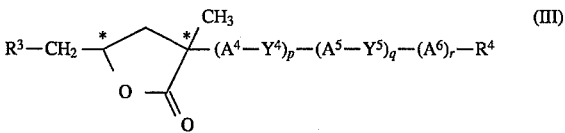

wherein $A^4$, $A^5$, $A^6$ are each a group containing a 6-membered ring having group selected from the group consisting of benzene, piperazine, cyclohexane, dioxacyclohexane and naphthalene, each of which is unsubstituted or substituted with one or more substituents of fluorine, chlorine, bromine, cyano, nitro, methyl or methoxy, X is —O—, —COO—, —OCO—, or a single bond, $Y^4$ and $Y^5$ are each —COO—, —OCO—, —OCH$_2$—, —CH$_2$O—, —CH$_2$CH$_2$, —CH=CH—, —C≡C— or a single bond, $R^3$ and $R^4$ are each straight-chain or branched-chain alkyl or alkoxy group having 1 to 15 carbon atoms, and p, q and r are each an integer of 0 to 1, and wherein one of the compounds (II) and (III) being active as the compound (a) and another being active as the compound (b) and, wherein the liquid crystal compound (c) is represented by the formula (IV):

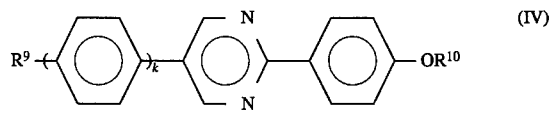

wherein $R^9$ and $R^{10}$ each represent an alkyl or alkoxy group having 1 to 15 carbon atoms and k denotes an integer of 0 or 1; or wherein the liquid crystal compound (c) is represented by the formula (V):

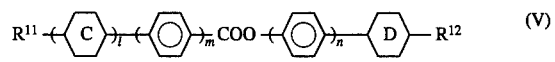

wherein $R^{11}$ and $R^{12}$ each represents an alkyl or alkoxy group having 1 to 15 carbon atoms with straight or branched-chain

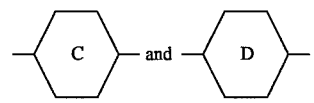

each represents a group

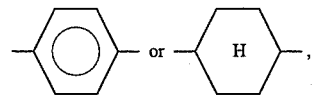

l, m and n each denotes an integer of 0 or 1, provided that the total of l, m and n is 1, 2 or 3; or wherein the compound (c) is at least one optically active compound of formulae (VII), (VIII) and (IX):

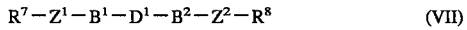  (VII)

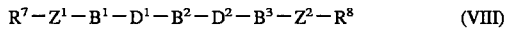  (VIII)

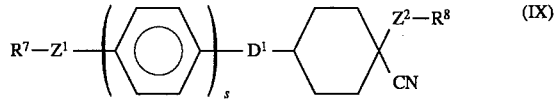  (IX)

wherein $B^1$, $B^2$ and $B^3$ are independently a 6-membered cyclic ring having group selected from the group consisting of benzene, cyclohexane, bicyclo[2.2.2]octane, pyridine, pyrimidine, pyrazine, dioxacyclohexane, and naphthalene, each of which is unsubstituted or substituted with one or more substituents of fluorine, chlorine, bromine, cyano, nitro, methyl, methoxy, trifluoromethyl; $D^1$ and $D^2$ each represent a single bond or —COO—, —OCO—, —CH=CH—, —C≡C—, —CH=CH—COO—, —OCO—CH=CH—, —CH$_2$CH$_2$—, —OCH$_2$—, —CH$_2$O—, —COS— or —SCO—; $Z^1$ and $Z^2$ are each a single bond or —COO—, —OCO—, —O—, —S—, —OCOO— or —CO—; $R^7$ and $R^8$ are each straight-chain or branched-chain alkyl group having 1 to 15 carbon atoms and containing 0 to 1 asymmetric carbon atom, each of which is unsubstituted or substituted with one or more substituents of fluorine, chlorine, bromine, cyano, nitro, methoxy, or trifluoromethyl; and S is an integer of 1 or 2.

2. A device as defined in claim 1 in which the liquid crystal compound (c) is represented by the formula (IV):

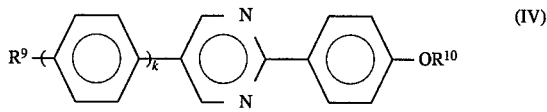

wherein $R^9$ and $R^{10}$ each represents an alkyl or alkoxy group having 1 to 15 carbon atoms and k denotes an integer of 0 or 1.

3. A device as defined in claim 1 in which the liquid crystal, compound (c) is represented by the formula (V):

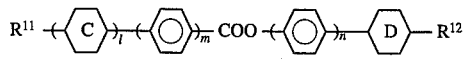

wherein $R^{11}$ and $R^{12}$ each represents an alkyl or alkoxy group having 1 to 15 carbon atoms with straight or branched-chain,

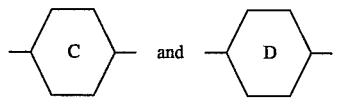

each represents a group

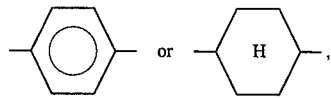

l, m and n each denotes an integer of 0 or 1, provided that the total of l, m and n is 1, 2 or 3.

4. A device as defined in claim 1 in which the content of the compounds (II) and (III) are each 0.5 to 30 wt % in the ferroelectric liquid crystal composition.

5. A device as defined in claim 4 in which the content of the compounds (II) and (III) are each 0.5 to 10 wt % in the ferroelectric liquid crystal composition.

6. The device as defined in claim 1, wherein the compound (c) is at least one optically active compound of the formulae (VII), (VIII) and (IX):

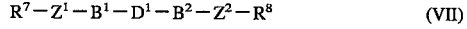

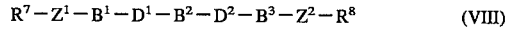

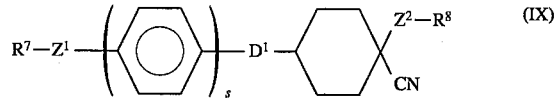

wherein $B^1$, $B^2$ and $B^3$ are independently a 6-membered cyclic ring having group selected from the group consisting of benzene, cyclohexane, bicyclo[2.2.2] octane, pyridine, pyrimidine, pyrazine, dioxacyclohexane, and naphthalene, each of which is unsubstituted or substituted with one or more substituents of fluorine, chlorine, bromine, cyano, nitro, methyl, methoxy, trifluoromethyl; $D^1$ and $D^2$ each represent a single bond or —COO—, —OCO—, —CH=CH—, —C≡—, —CH=CH—COO—, —OCO—CH=CH—, —CH$_2$CH$_2$—, —OCH$_2$—, —CH$_2$O—, —COS— or —SCO—; $Z^1$ and $Z^2$ are each a single bond or —COO—, —OCO—, —O—, —S—, —OCOO— or —CO—; $R^7$ and $R^8$ are each straight-chain or branched-chain alkyl group having 1 to 15 carbon atoms and containing 0 or 1 asymmetric carbon atom, each of which is unsubstituted or substituted with one or more substituents of fluorine, chlorine, bromine, cyano, nitro, methoxy, or trifluoromethyl; and s is an integer of 1 or 2.

7. A ferroelectric liquid crystal device having a pair of substrates each provided with voltage applying means, an orientation control layer formed on at least one of the substrates, and a layer of ferroelectric liquid crystal composition disposed between the pair of substrates, the ferroelectric liquid crystal composition comprising at least one compound (a) having an optically active group of formula (I):

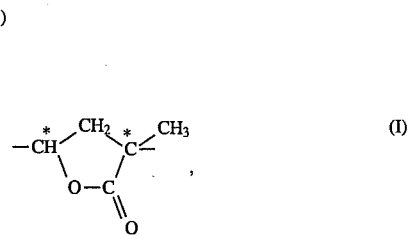

at least one compound (b) which is reverse to the compound (a) in the direction of a helical pitch induced in a nematic phase and at least one liquid crystal compound (c) exhibiting a smectic C phase, the liquid crystal composition exhibiting at least a smectic C phase, smectic A phase and nematic phase, wherein the ferroelectric liquid crystal composition comprises the optically active compounds (II) and (III):

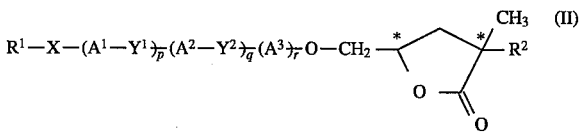

wherein $A^1$, $A^2$, $A^3$ are each a group containing a 6-membered ring having group selected from the group consisting of benzene, piperazine, cyclohexane, dioxacyclohexane and naphthalene, each of which is unsubstituted or substituted with one or more substituents of fluorine, chlorine, bromine, cyano, nitro, methyl or methoxy, X is —O—, —COO—, —OCO— or a single bond, $Y^1$ and $Y^2$ are each —COO—, —OCO—, —OCH$_2$—, —CH$_2$O—, —CH$_2$CH$_2$—, —CH=CH—, —C≡C— or a single bond, $R^1$, $R^2$ are each straight-chain or branched-chain alkyl or alkoxy group having 1 to 15 carbon atoms, and p, q and r are each an integer of 0 to 1, and

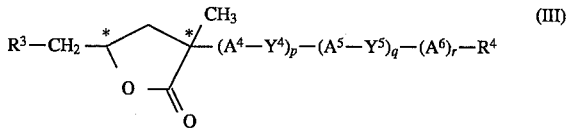

wherein $A^4$, $A^5$, $A^6$ are each a group containing a 6-membered ring having group selected from the group consisting of benzene, piperazine, cyclohexane, dioxacyclohexane and naphthalene, each of which is unsubstituted or substituted with one ore more substituents of fluorine, chlorine, bromine, cyano, nitro, methyl or methoxy, X is —O—, —COO—, —OCO—, or a single bond, $Y^4$ and $Y^5$ are each —COO—, —OCO—, —OCH$_2$—, —CH$_2$O—, —CH$_2$CH$_2$—, —CH=CH—, —C≡C— or a single bond, $R^3$ and $R^4$ are each straight-chain or branched-chain alkyl or alkoxy group having 1 to 15 carbon atoms, and p, q and r are each an integer of 0 to 1, and wherein one of the compounds (II) and (III) being active as the compound (a) and another being active as the compound (b), and wherein the liquid crystal compound (c) is represented by the formula (IV):

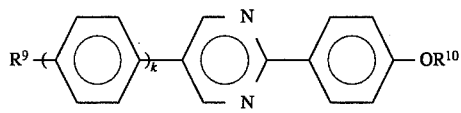 (IV)

wherein $R^9$ and $R^{10}$ each represent an alkyl or alkoxy group having 1 to 15 carbon atoms and k denotes an integer of 0 or 1; or wherein the liquid crystal compound (c) is represented by the formula (V):

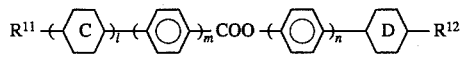 (V)

wherein $R^{11}$ and $R^{12}$ each represents an alkyl or alkoxy group having 1 to 15 carbon atoms with straight or branched-chain

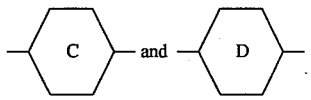

each represents a group

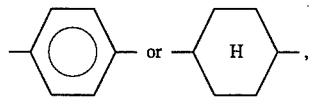, l, m and n each denotes an integer of 0 or 1, provided that the total of l, m and n is 1, 2 or 3; or wherein the compound (c) is at least one optically active compound of the formulae (VII), (VIII) and (IX):

$R^7-Z^1-B^1-D^1-B^2-Z^2-R^8$ (VII)

$R^7-Z^1-B^1-D^1-B^2-D^2-B^3-Z^2-R^8$ (VIII)

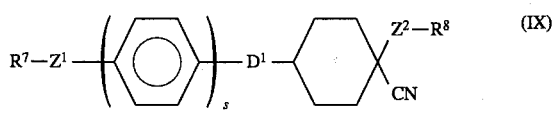 (IX)

wherein $B^1$, $B^2$ and $B^3$ are independently a 6-membered cyclic ring having group selected from the group consisting of benzene, cyclohexane, bicyclo[2.2.2]octane, pyridine, pyrimidine, pyrazine, dioxacyclohexane, and naphthalene, each of which is unsubstituted or substituted with one or more substituents of fluorine, chlorine, bromine, cyano, nitro, methyl, methoxy, trifluoromethyl; $D^1$ and $D^2$ each represent a single bond or —COO—, —OCO—, —CH=CH—, —C≡C—, —CH=CH—COO—, —OCO—CH=CH—, —CH$_2$CH$_2$—, —OCH$_2$— —CH$_2$O—, —COS— or —SCO—; $Z^1$ and $Z^2$ are each a single bond or —COO—, —OCO—, —O—, —S—, —OCOO— or —CO—; $R^7$ and $R^8$ are each straight-chain or branched-chain alkyl group having 1 to 15 carbon atoms and containing 0 to 1 asymmetric carbon atom, each of which is unsubstituted or substituted with one or more substituents of fluorine, chlorine, bromine, cyano, nitro, methoxy, or trifluoromethyl; and s is an integer of 1 or 2.

* * * * *